United States Patent
Hart et al.

(10) Patent No.: US 9,794,854 B2
(45) Date of Patent: Oct. 17, 2017

(54) OPTIMIZING PACKET/FRAME FORWARDING OR ROUTING IN A WIRELESS BACKHAUL TRANSPORT SYSTEM

(71) Applicant: Google Inc., Mountain View, CA (US)

(72) Inventors: Michael Hart, Seattle, WA (US); Peter Gelbman, Bothell, WA (US)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 14/774,022

(22) PCT Filed: Mar. 14, 2014

(86) PCT No.: PCT/US2014/029760
§ 371 (c)(1),
(2) Date: Sep. 9, 2015

(87) PCT Pub. No.: WO2014/153237
PCT Pub. Date: Sep. 25, 2014

(65) Prior Publication Data
US 2016/0021597 A1    Jan. 21, 2016

Related U.S. Application Data

(60) Provisional application No. 61/785,981, filed on Mar. 14, 2013.

(51) Int. Cl.
*H04W 4/00* (2009.01)
*H04W 40/06* (2009.01)
(Continued)

(52) U.S. Cl.
CPC ............ *H04W 40/06* (2013.01); *H04L 41/12* (2013.01); *H04L 45/74* (2013.01); *H04W 72/04* (2013.01); *H04W 84/18* (2013.01)

(58) Field of Classification Search
CPC ..... H04W 40/06; H04W 72/04; H04W 84/18; H04L 45/74; H04L 41/12
See application file for complete search history.

(56) References Cited

U.S. PATENT DOCUMENTS 5,933,421 A * 8/1999 Alamouti ............. H04B 7/0837
370/203
6,704,794 B1 * 3/2004 Kejriwal ................ H04L 29/06
370/392

(Continued)

FOREIGN PATENT DOCUMENTS

| EP | 2501181 A2 | 9/2012 |
|---|---|---|
| KR | 20080073399 A | 8/2008 |

OTHER PUBLICATIONS

International Search Report for Application No. PCT/US2014/029760 dated Aug. 25, 2014.

*Primary Examiner* — Afshawn Towfighi
(74) *Attorney, Agent, or Firm* — Lerner, David, Littenberg, Krumholz & Mentlik, LLP

(57) ABSTRACT

Systems and methods are described for providing wireless backhaul transport. One element of the system is a highly integrated radio transceiver, including an integrated antenna. The radio transceiver may operate in the millimeter wave range (between 30 GHz and 300 GHz), and due to the small wavelengths, it is possible to integrate the antenna, which may typically comprise a number of antenna elements, with the radio transceiver in a single integrated circuit (IC) package, commonly referred to as a system-in-package (SiP) and/or antenna-in-package (AiP) format. The system supports multi-hop point-to-multipoint or multi-hop mesh networking topologies. Low level MAC routing tables are built and maintained to enable efficient packet and frame forwarding.

17 Claims, 21 Drawing Sheets

(51) Int. Cl.
*H04L 12/24* (2006.01)
*H04L 12/741* (2013.01)
*H04W 72/04* (2009.01)
*H04W 84/18* (2009.01)

(56) References Cited

U.S. PATENT DOCUMENTS

| | | |
|---|---|---|
| 7,881,474 B2 | 2/2011 | Sun |
| 2005/0064909 A1* | 3/2005 | Kim .................... H04B 7/0619 455/562.1 |
| 2006/0221949 A1* | 10/2006 | Anjum .................... H04L 45/00 370/389 |
| 2008/0095163 A1* | 4/2008 | Chen ....................... H04L 45/16 370/392 |
| 2011/0026505 A1* | 2/2011 | Trainin ................. H04L 1/1621 370/338 |
| 2012/0230247 A1 | 9/2012 | Kwon et al. |
| 2013/0039265 A1 | 2/2013 | Shin et al. |
| 2013/0281009 A1* | 10/2013 | Parish .................... H04B 7/155 455/7 |
| 2013/0294446 A1* | 11/2013 | Smith ................. H04L 63/0414 370/389 |
| 2013/0345530 A1* | 12/2013 | McRoberts .......... A61B 5/0022 600/323 |

\* cited by examiner

- Each module typically provides of the order of +/-45 deg vertical coverage
- Additional module could be mounted facing up to enable effective +/-135 deg coverage, enabling easier connection to roof-top hub for a unit located at street level
- The upward facing module could even be integrated with any GPS antenna that is communicating with satellites for timing & sync

OPTIMIZING PACKET/FRAME FORWARDING OR ROUTING IN A WIRELESS BACKHAUL TRANSPORT SYSTEM

CROSS-REFERENCE TO RELATED APPLICATION(S)

The present application is a national phase entry under 35 U.S.C. §371 of International Application No. PCT/US2014/029760, filed Mar. 14, 2014, published on Sep. 25, 2014 as WO 2014/153237 A1, which claims priority to and the benefit of U.S. Provisional Patent Application No. 61/785,981, filed Mar. 14, 2013, entitled "OPTIMIZING PACKET/FRAME FORWARDING OR ROUTING IN A WIRELESS BACKHAUL TRANSPORT SYSTEM." The disclosures of the above-listed applications are hereby incorporated by reference herein in their entirety.

BACKGROUND

Mobile data traffic growth is exploding, and is projected by Cisco to continue to grow at a global CAGR of 78% until at least 2016. Similarly, traffic on fixed access networks is also growing aggressively, driven by new bandwidth intensive, video rich, applications & services, and the trend towards centralization of services into "the cloud" and the "big data" era.

Both wireless and fixed access networks will have to dramatically scale their ability to provide high capacity transport in the core as well high data rates to the end users in order to not only meet this demand but to be able to provide it in a much more cost/GB efficient manner.

Wireless access networks are transitioning from the old coverage centric design methodology to one of cost-effective provision of capacity. This means smaller, more efficient "cells", providing targeted capacity where it is needed using whatever access technology and spectrum is available, including WiFi in unlicensed spectrum bands, and HSPA and LTE in licensed spectrum bands, and LTE advanced and future generations of "5G" in both licensed, "lightly-licensed" and unlicensed bands. While technology exists to enable these "small cells" to be manufactured, supporting one or more of the family of "4G" technologies and spectrum bands, a challenge is in similarly cost-effectively scaling the backhaul network to connect potentially thousands of these access nodes across a metropolitan area into the core network.

Wired access networks are also being evolved, pushing fiber closer to the edge, and upgrading transport in the core from 10G to 40G to 100 Gbps. In some countries and regions fiber to the home/premises (FTTH/P) has been aggressively deployed. In others, especially where local regulations require buried distribution networks, the cost is too prohibitive, and instead fiber to the curb/node (FTTC/N) is pursued, using enhanced DSL or other copper based technologies, such as copper based Ethernet, to provide the last leg of the connection into the home or business premise. While using advanced DSL technologies over pre-installed copper telephone lines enables fast Ethernet services to the home (~100 Mbps), it is questionable how far buried copper based networks can continue to scale. Hence, a challenge is in cost-effectively scaling the last leg of the distribution network to provide FTTH like services without the huge expense associated with laying fiber to every potential subscriber.

While there is a role for "wired" transport technologies to play in both cases outlined above, predominantly in the form of fiber, in a large number of cases the use may be cost-prohibitive. This may occur in the case that the location at which the connection is required is not readily served by an existing fiber run and may therefore require a special installation and expenditure that pushes the cost per GB transported beyond the market rate. It is worth noting that the cost-economics of fiber generally work when a fiber is well utilized; therefore, runs are installed to nodes that have high utilization, or a run is typically shared with multiple end users (i.e. GPON FTTH).

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

Figure 1:
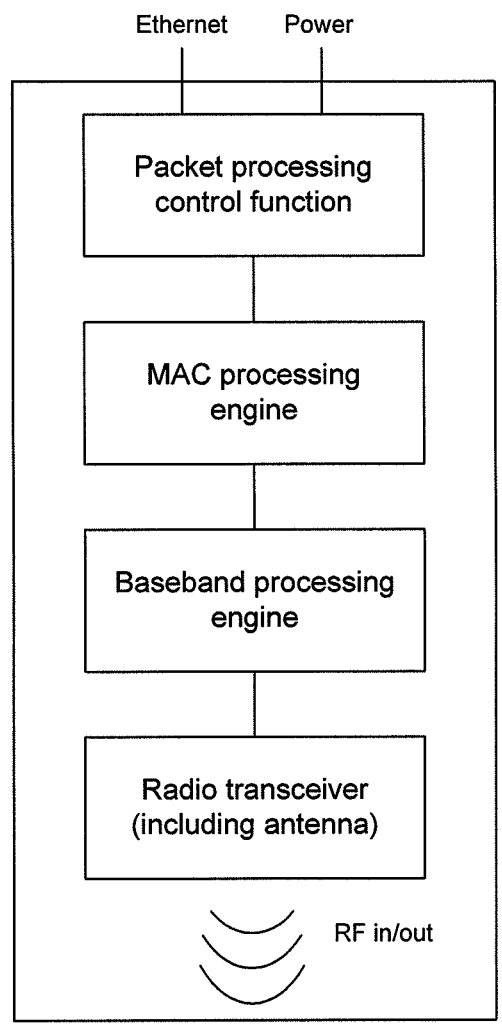
FIG. 1 is a block diagram of a module for providing wireless backhaul transport.

In the cases where fiber is prohibitively expensive, there is a role for wireless technologies. However, there is a lack of a solution that can meet all of the current requirements that also has a roadmap to continue to scale with the expected demand. Some features for a solution can be summarized as:

Ability to provide low latency, minimum FE like speeds to nodes/users, scaling to gigabit over Ethernet (GbE) like speeds and beyond Simple to deploy and install—no complex planning, engineering or installation practices required; enables transport of data to/from multiple access nodes and a single fiber PoP in a metropolitan area (metro-zone)

Low cost capital expenditures and operating expenses (CAPEX & OPEX)

Simple to operate and maintain—self organization and adaptive to changes in network topology Some existing technologies may address one of these features, but no current technology addresses all.

Systems, modules, hardware, and software are described herein that provide wireless backhaul transport. The following description meets the aforementioned features for a transport solution as well as providing other advantages. One element of the system is a highly integrated radio transceiver, including an integrated antenna. The radio transceiver may operate in the millimeter wave range (between 30 GHz and 300 GHz), and due to the small wavelengths, it is possible to integrate the antenna, which may typically compromise a number of antenna elements, with the radio transceiver in a single integrated circuit (IC) package, commonly referred to as a system-in-package (SiP) and/or antenna-in-package (AiP) format. One band that a hardware module can exploit is the unlicensed 60 GHz band, which is generally available globally. However, as new bands become available above 100 GHz, additional embodiments and implementations may exploit different frequency ranges, for example a band at 120 GHz or 240 GHz.

Also described herein is a system and method for addressing in an IEEE 802.11ad system that is extended to support multi-hop point-to-multipoint or multi-hop mesh networking topologies, and how low level MAC routing tables are built and maintained to enable very efficient packet and frame forwarding. Such forwarding and routing functionality may be embedded in software of firmware within the wireless backhaul transport nodes.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

System Description

As noted above, the radio transceiver under an aspect of the invention includes an integrated antenna, in a SiP, including an AiP, format. The antenna may be configured to allow the focusing of the energy associated with a transmission in a particular direction (beam direction), such as to improve the resilience of the link in the form of an overall increase in the signal to noise plus interference ratio.

FIG. 1 depicts the overall architecture of a wireless communication transceiver module that converts Ethernet frames to a beamformed radio signal, such as a 60 GHz beamformed radio signal, and a beamformed radio signal to Ethernet frames. The wireless communication transceiver module includes a layer-2 packet processing function (PPF), which may incorporate a bridging or switching function, a MAC processing engine, a baseband processing engine, and a radio transceiver. On the transmit side, the module receives Ethernet frames from the host node in which it is embedded, or from another module or host node to which it is connected. In addition the power for the module may be supplied using power over Ethernet or an alternative source in the case that power over Ethernet is not supported by the host node. The PPF translates Ethernet frames to the frame format used at the MAC sub-layer. In addition, the PPF may buffer frames and perform quality of service (QoS) queuing/dequeuing functions, may apply frame filtering, and may perform frame header operations such as manipulating marking or tags of specific frames. The MAC processing engine controls access to the physical wireless medium, which may be either a point-to-point (1 to 1) or point-to-multi-point (1 to many) communication channel. The baseband processing engine provides physical layer functionality, converting MAC frames into a baseband signal. The baseband processing engine also controls the mode of operation of the radio transceiver, which includes at least one antenna and a radio frequency integrated circuit (RFIC). Typically, the baseband processing engine converts the transmitted signal into an analog signal that is provided to the RFIC. In addition, it controls the operation of the RFIC over a digital interface. In particular, the baseband processing engine configures the transmit antenna settings so that they are appropriate for each frame transmitted. The reverse operation is supported on the receive side. Further details regarding elements of the wireless communication transceiver module are provided herein.

Figure 2:
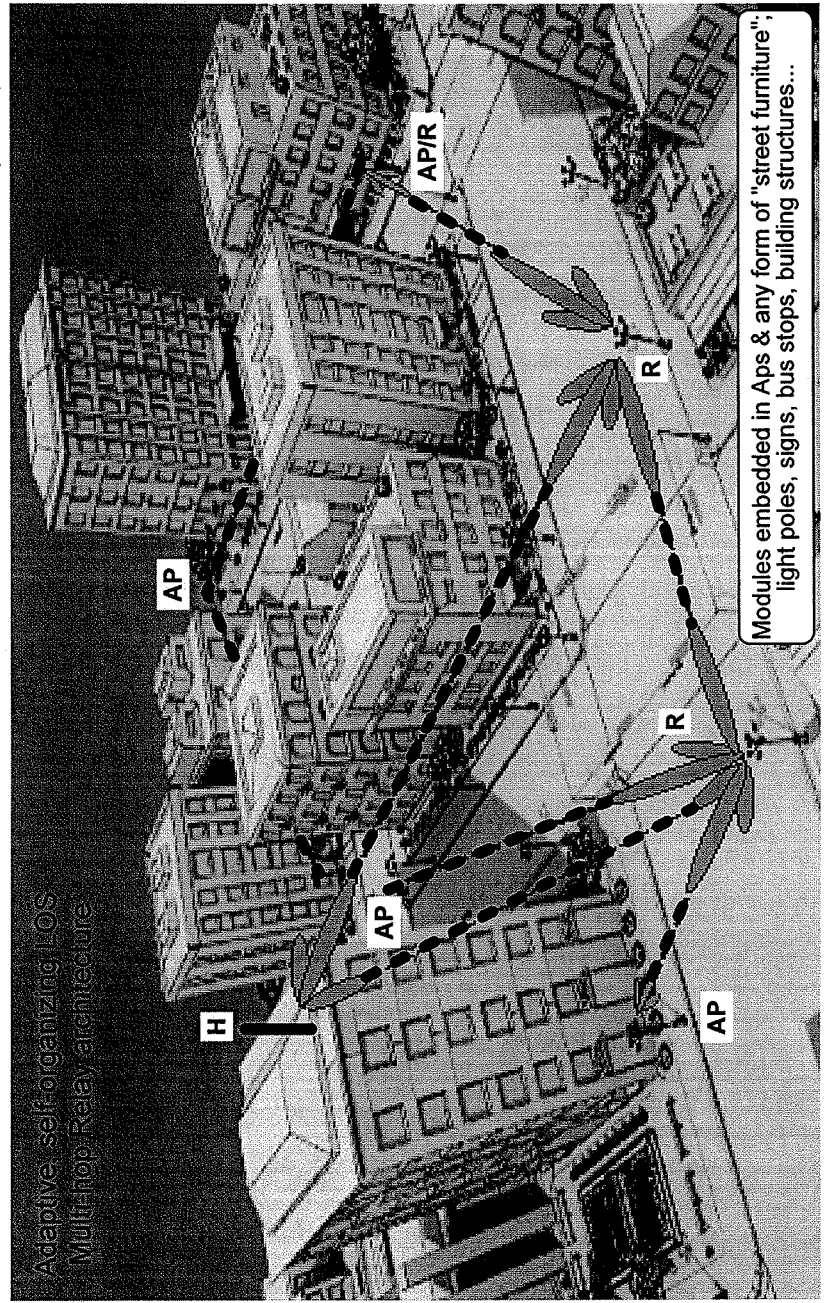
FIG. 2 is a diagram showing a deployment of nodes that contain modules within a city block for providing wireless backhaul transport.

FIG. 2 depicts the different ways in which different node types containing one or more hardware modules are used to provide the overall solution to the problem. FIGS. 3A-J depict how modules may be integrated to form different node types, including specific details of the operation of the modules to provide relaying functionality within a multi-hop point-to-multi-point or multi-hop mesh network. FIG. 4 shows some benefits of using multi-hop communication in either a point-to-multi-point or mesh topology for providing a wireless backhaul transport.

Figure 3A:
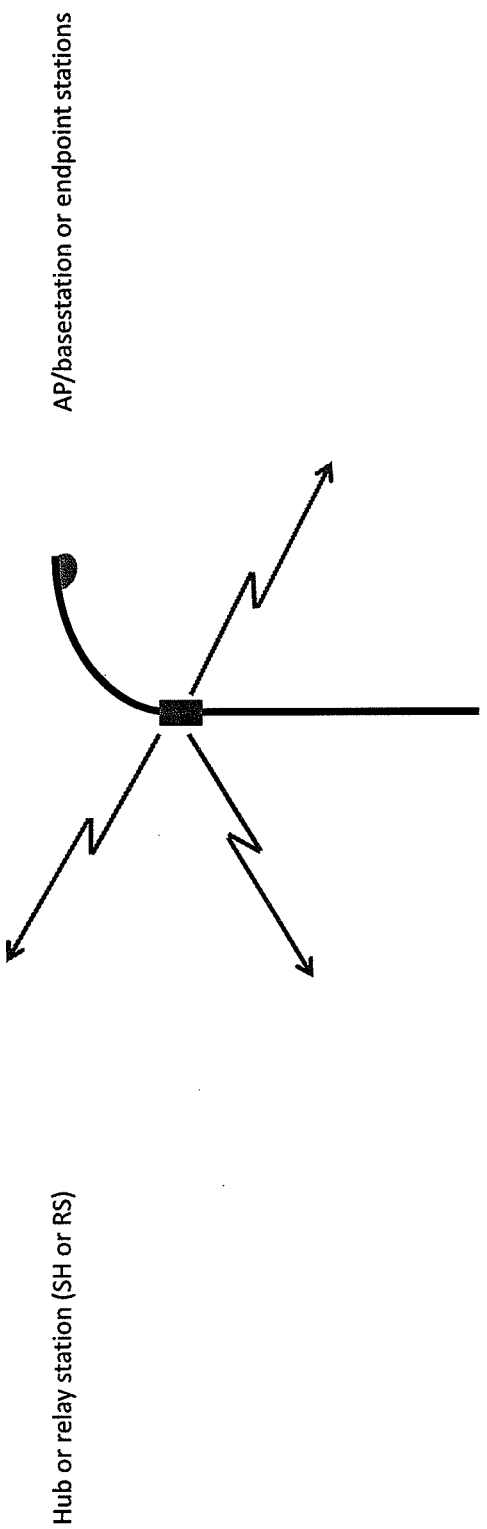
FIGS. 3A-3C are diagrams showing how modules can be implemented and used to form various types of nodes for providing wireless backhaul transport.
Figure 4:
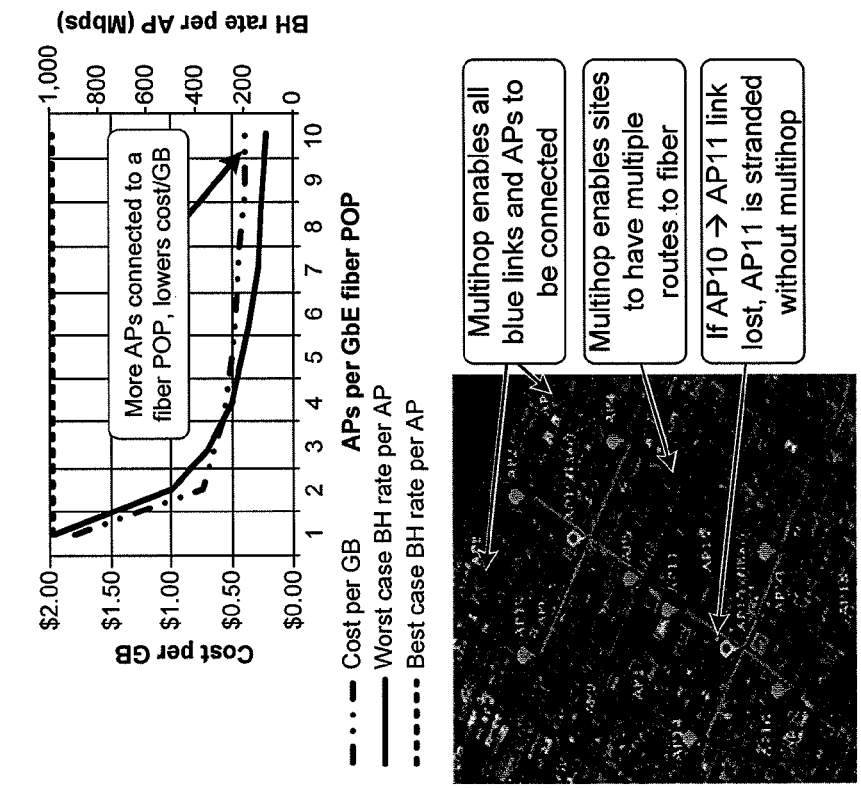
FIG. 4 is a diagram describing some benefits of using multi-hop communication for providing a wireless backhaul transport.

FIG. 3A shows an example of one or more of the wireless communication transceiver modules of FIG. 1 incorporated into a wireless node, such as a hub or relay station (HS or RS), or as an access point (AP), base station or endpoint station. The node is shown mounted on a light pole that may be positioned, e.g., over a street. The node of FIG. 3A may include an integrated panel array antenna with ~+/−60 deg steerable beam coverage in azimuth, and ~+/−45 deg steerable beam coverage in elevation. The node may employ Power-over-Ethernet input, and produce 60 GHz beamformed output.

As a hub or relay station in a multi-hop point-to-multi-point or multi-hop mesh network topology, the node may incorporate 2, 3 or 4 modules combined to provide up to complete 360 deg coverage (e.g. at intersection 4 radios cover north, east, south, west directions). For a hub, if each link is at 1 Gbps, then the hub provides up to 4 Gbps capacity. Hub is the point of connection to fiber, or other backhaul mechanism behind the 60 GHz multi-hop point-to-multipoint or multi-hop mesh network.

Furthermore, the hub or relay station may be a standalone unit that is mounted on to an existing structure (e.g. a light pole, face of a building, behind a sign, at a bus or train stop, etc), or it could itself be embedded within that structure. For example a light pole could integrate 1 or more modules, and provide PoE to the module (as shown in FIG. 3A). The light pole with integrated module would then present an integrated interface port (e.g. Ethernet port) such that any node that required a connection to a wider area network could be affixed to the light pole to not just gain power and a location to be mounted, but to also gain connectivity to a communication network. One such example of use of a "networked light pole" would be where a security camera could be mounted and connected to the Ethernet port on the pole. The "networked light pole" provides a physical mounting point, power and also connectivity of the security camera to a security network enabling the transmission of video frames to a centralized control center, and a means for the control center to control the camera. This example is intended to describe one such application that could be enabled by embedded modules into various types of "street-level furniture", and there are many others that can be envisaged if the module is embedded into advertising signs, traffic signs, bus stops, train stops etc. In addition, not only do the pieces of street furniture gain the ability to provide access to a communication network to other units mounted on to them, but the modules embedded within them can connect together to form a multi-hop and/or mesh transport network to assist in connecting other "networked street-furniture" elements together.

As an AP, basestation or endpoint station, the node may incorporate a minimum of 1 wireless communication transceiver module integrated with into a non-hub or RS station. In this case only coarse alignment is needed—point in either north, east, south or west direction towards a hub or RS. Installation can be further simplified by increasing number of modules.

Figure 3B:
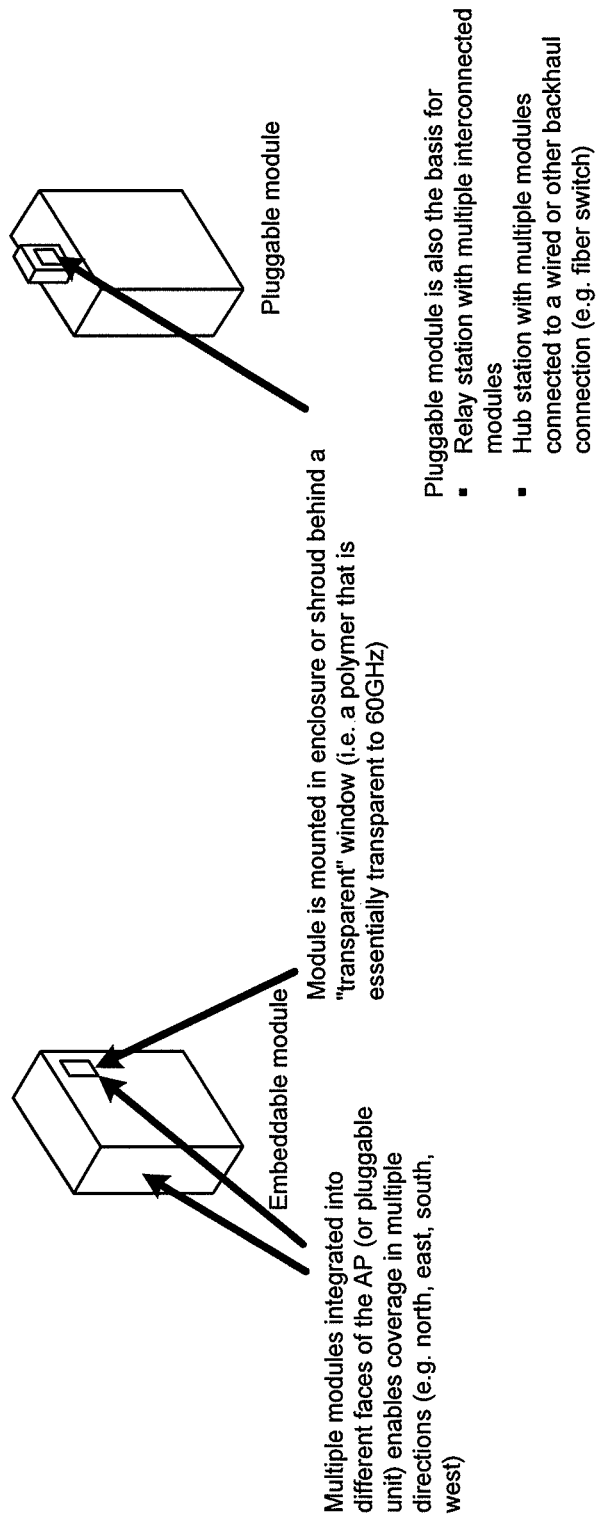
Figure 3C:
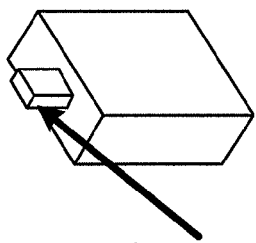
Figure 3C:
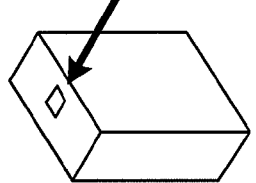
Figure 3C:
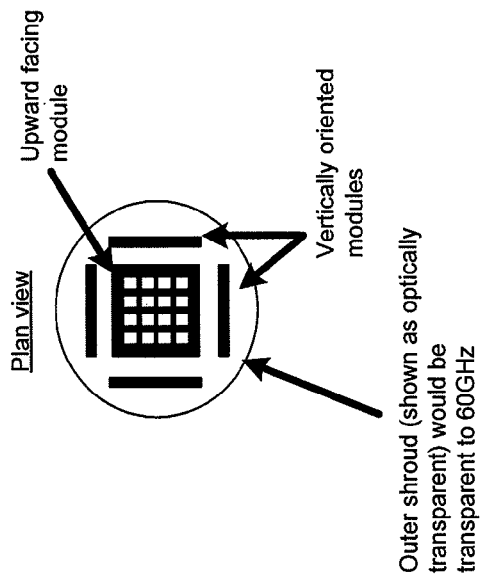

FIGS. 3B and 3C show use of one or more wireless communication transceiver ("modules") integrated with the AP or other node, e.g. embedded inside the AP case or shroud surrounding the AP, and pluggable and connects to the AP in an integrated way (e.g. weatherized power-over-Ethernet connector).

One implementation shown in Plan view in FIG. 3C includes four vertically orientated modules, and one horizontal module as shown. This implementation includes a horizontal module that may incorporate GPS receive functionality. All 5 modules can be incorporated into a "dome" similar to that used for GPS receivers. The node may be backhaul capable pluggable unit that replaces the GPS dome typically installed on the top of access points, or can be added in addition in a similar manner.

Referring back to FIG. 1, the baseband processing engine is capable of generating wideband analog I/Q (in-phase and quadrature phase) signals for modulation to the radio frequency carrier by the radio transceiver, as well as configuring parameters associated with the radio transceiver that control the beam direction. The baseband engine is capable of taking digitized information signals on the order of Gbps and transposing them to an analog IQ signal of 1 GHz or greater bandwidth. In addition, the baseband engine may dynamically reduce available data rate in order to increase the system gain (e.g. by reducing the bandwidth used to reduce the noise in the system, or maintaining the wide bandwidth but increasing the coding overhead, thereby increasing the "processing gain"). Increasing the system gain equates to increasing the tolerable propagation loss between a transmitter and receiver, hence improving the robustness of a link enabling either an increase in range or resiliency to a link degrading event, such as rain, that causes an increase in the signal attenuation between a transmitter and receiver. From a protocol layer point of view, the "Physical layer" of the present system includes this baseband processing engine element. In some implementations, the interface between the first and second element is at baseband frequency (i.e. between the radio transceiver and the baseband processing engine). In other implementations, the interface is at some intermediate frequency, somewhere between the baseband (0 Hz) and RF frequency (e.g. 60 GHz). In addition, a control interface allows the baseband processing engine to control the properties of the radio transceiver, including parameters such as beam direction, antenna phase, transmit power, gain of amplifiers, polarization mode, etc. These first and second elements combined enable the transmission of digital signals over a wireless link in a certain direction.

Using the control interface, the baseband processing engine configures the antenna beam. In some implementations, the baseband processing engine configures the antenna beam by applying a set of phase shifts to each element in the array. Alternatively or additionally, the baseband processing engine configures the antenna beam by applying a complex number that contains both phase and amplitude (gain) adjustment for each element in the array. In another form, the baseband processing engine configures the antenna beam by turning array elements on and off, this could be, for example, windows in a waveguide structure, or could be controlling polarization used for a particular baseband signal. In its simplest form, the baseband processing engine identifies a beam identifier (ID) or antenna weight vector (AWV) ID or antenna element map (AEM) ID to be used at any point in time by the RFIC. The RFIC includes a mapping of ID to actual vector or element configuration to apply, where the vector or element configuration is determined and optimized during a beam training, refinement, and/or tracking phase. In some implementations, the baseband engine provides a full AWV or AM to the RFIC, and the baseband engine maintains a list of AWVs/AEMs to use for each node that it is communicating with.

In this case, the AWV contains a set of phase and gain values where the size of the vector is equal to the number of elements in the antenna array, such that the baseband processing engine is able to control both the phase shift and any amplitude gain (or attenuation) of the signal supplied to each element in the array. Or if an AEM is used, then it contains a set of settings for each element (and possibly a set for each polarization of element) in the array (e.g. on/off), such that the baseband processing engine is able to control the effective spacing between elements in an array and/or the polarization used. Either of these approaches, and even a combination of them, allows the baseband processing engine to form various types of beam pattern and to steer both wanted energy in the desired direction, as well as to minimize the transmission of energy in the form of side-lobes, in an unwanted direction. Similarly, it allows the baseband processing engine to control where energy is received from on the receive side. It also enables a baseband engine to employ "multiple-input-multiple-output" techniques to transmit and receive simultaneously over more than one polarization to increase data rate and/or robustness. In the case where the RFIC supports simultaneous transmit and receive operations, then the baseband engine configures two sets of AWVs/AEMs to control the direction of both the transmit and receive array. In the case where the RFIC supports simultaneous transmit or receive on two different polarizations (e.g. vertical and horizontal MIMO), then there will be two AWVs/AEMs per RFIC.

The MAC processing engine controls the transmission of high layer protocol (e.g. Ethernet, IP, etc.) packets over one or more wireless links between nodes implementing the disclosed architecture. The MAC engine implements software that contains algorithms and methods to facilitate communication with multiple nodes using directional antennas. It also facilitates communication with nodes not within range of the wireless link, such as by using multi-hop point-to-multipoint or multi-hop techniques to communicate via other nodes. The MAC processing engine is "beam aware" and intimately involved in the control of the configuration of the radio transceiver, through the baseband processing engine, to ensure frames and packets are transmitted and received with the appropriate antenna configuration. This is achieved by supplying an associated "beam configuration" to use when transmitting the frame with each MAC protocol data unit (MPDU) that is formed and sent to the baseband processing engine that hosts the physical layer functionality. As discussed earlier, the beam configuration can be a simple index to a beam ID to use, or can be a full AWV. In some implementations, the MAC engine enables the use of a baseband processing engine that is not "beam-aware." For example, the MAC engine may interface directly to the RFIC such that it controls the RFIC and the baseband processing engine concurrently to ensure that the signal generated (or received) by the baseband engine is transmitted (or received) with the appropriate beam configuration. In such implementations, the MAC engine would facilitate beam-forming training by configuring the baseband engine in a mode that supports this (e.g. low data rate, high processing gain) and then transitioning it to a "data-mode" (e.g. higher data rate, reduced processing gain) once training is complete. The MAC engine may generate control-frames and insert these into the data-path, e.g. in the form of specially addressed Ethernet frames, that the baseband is processing as well as control the PPF function to ensure that frames are only transferred to and from the baseband when it is operating in "data-mode".

The MAC processing engine is also capable of supporting multi-hop point-to-multipoint or multi-hop mesh communications, or the transmission of a frame seamlessly over multiple, successive wireless links without the intervention of higher-layer protocols. It may achieve this by incorporating a layer-2 forwarding function within the MAC layer so that frame forwarding decisions can be made within the MAC layer itself, as the MAC layer is aware of the status of inbound and outbound physical links and beam settings. Incorporating a layer-2 forwarding function with the MAC layer enables rapid decision-making and optimal decisions to be made by the forwarding function that is both physical layer status and beam aware. One benefit of MAC layer relaying is that per link latency can be reduced compared to using higher-layer bridging. In addition, the utilization of the inbound and outbound physical layer link can be adjusted in harmony, resulting in more efficient transport of packets compared to where relaying was performed without context of the MAC and physical layer status. Referring to FIG. 3F, this allows a single module to provide both the "downstream" (e.g. to an access point) and "upstream" (e.g. to a hub station) relaying of frames simultaneously. In implementations in which relaying is provided at a higher layer, two modules may be required—one connected to the hub and one connected to the access point.

Figure 3D:
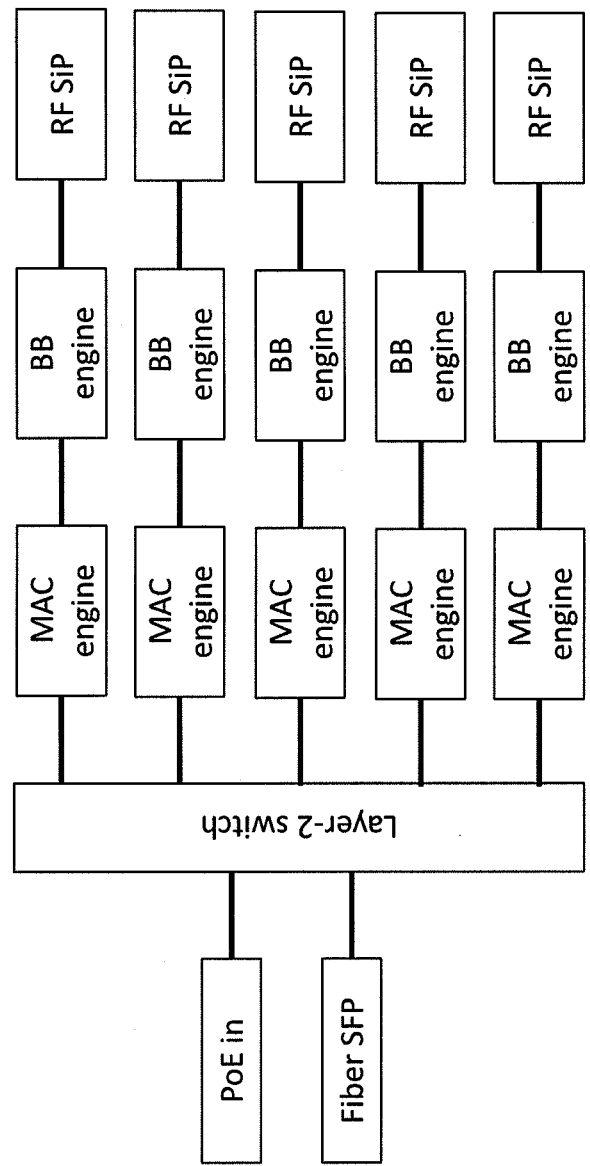
FIGS. 3D-3F and 3H-3K are diagrams showing elements incorporated into different implementations of the modules of FIGS. 3A-3C.
Figure 3E:
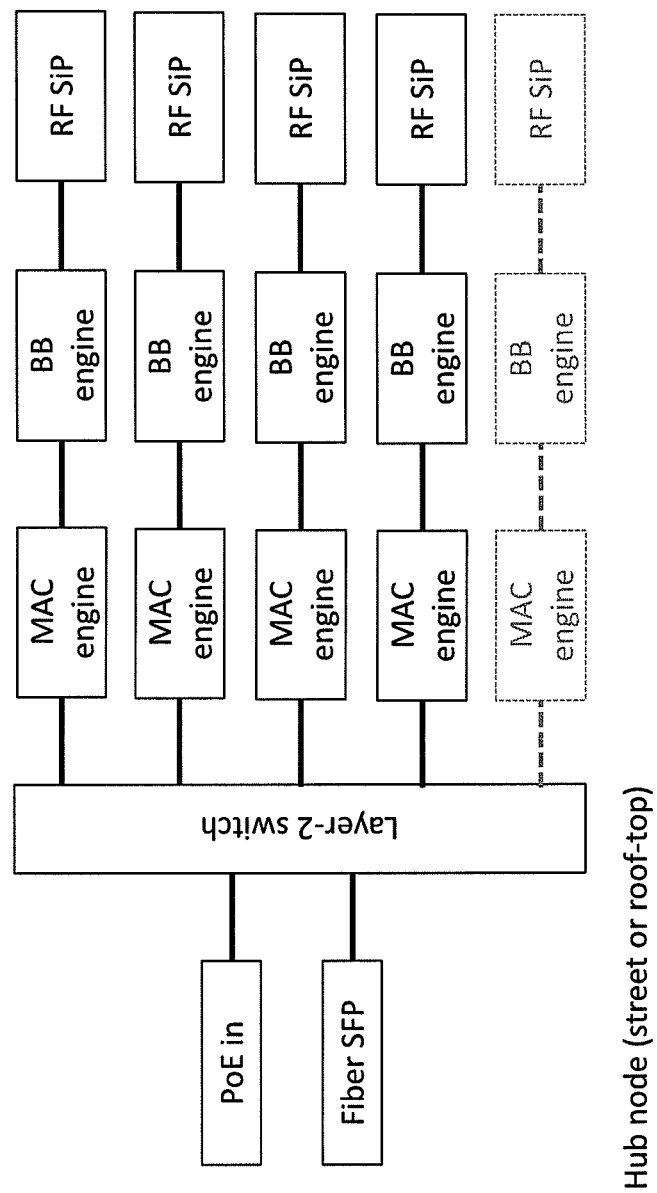
Figure 3F:
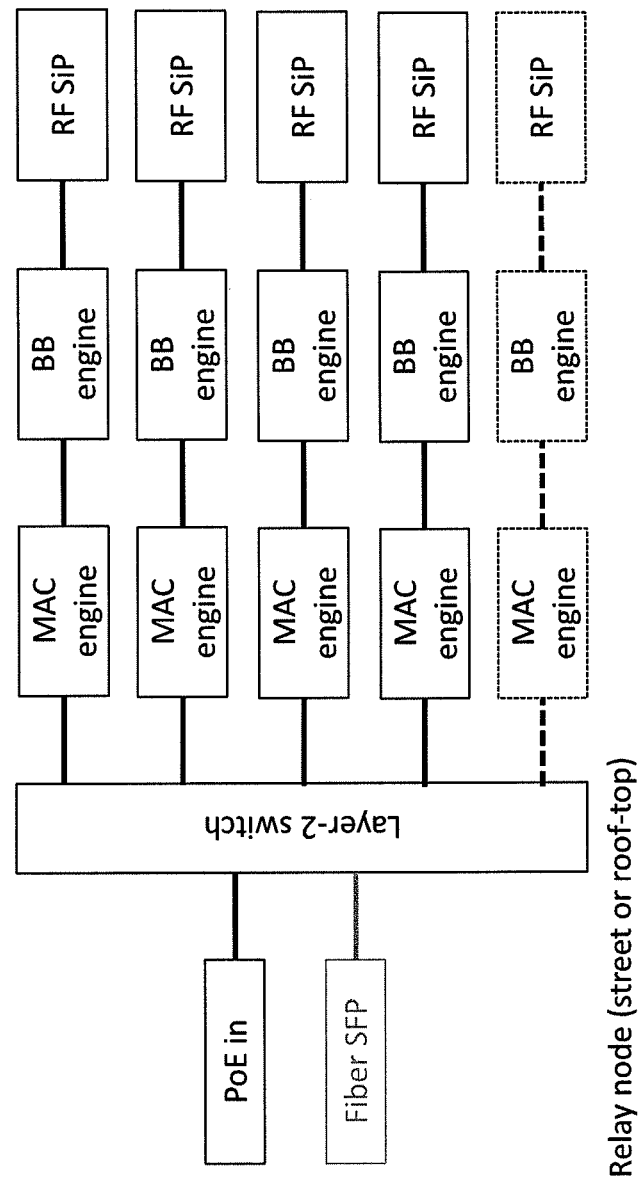
Figure 3G:
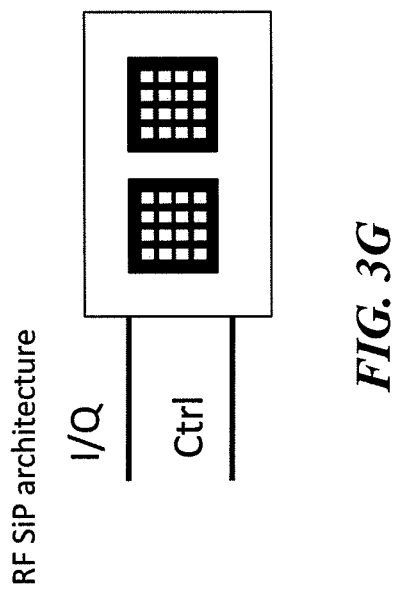
FIG. 3G is a diagram showing an example of an RF SiP architecture.
Figure 3H:
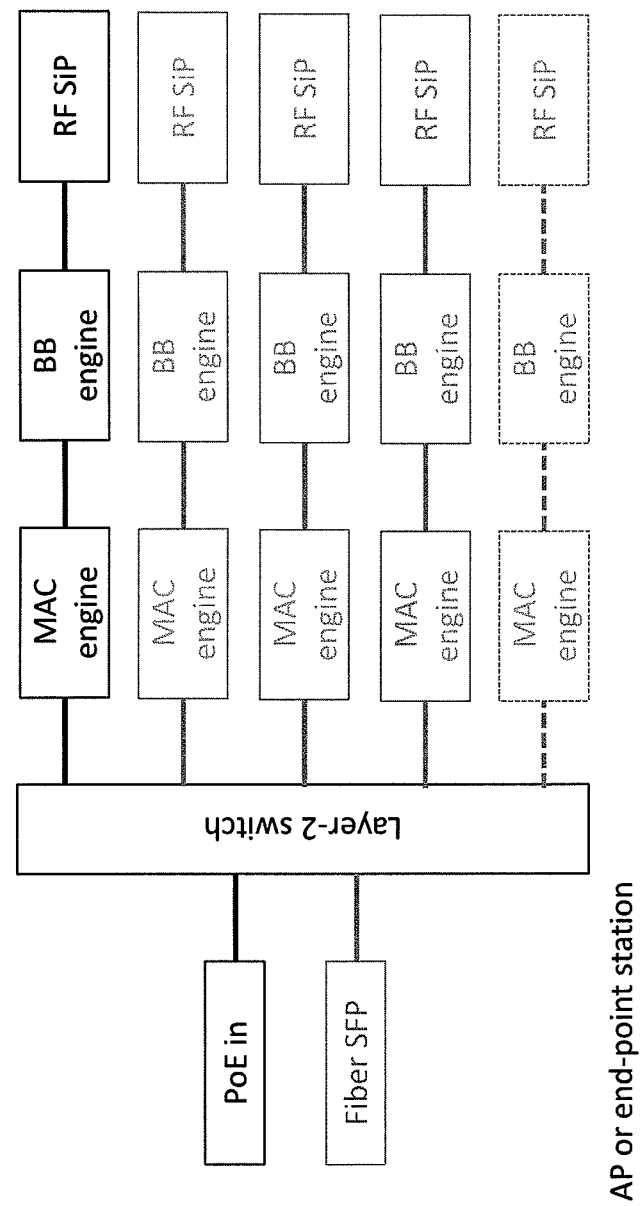
Figure 3I:
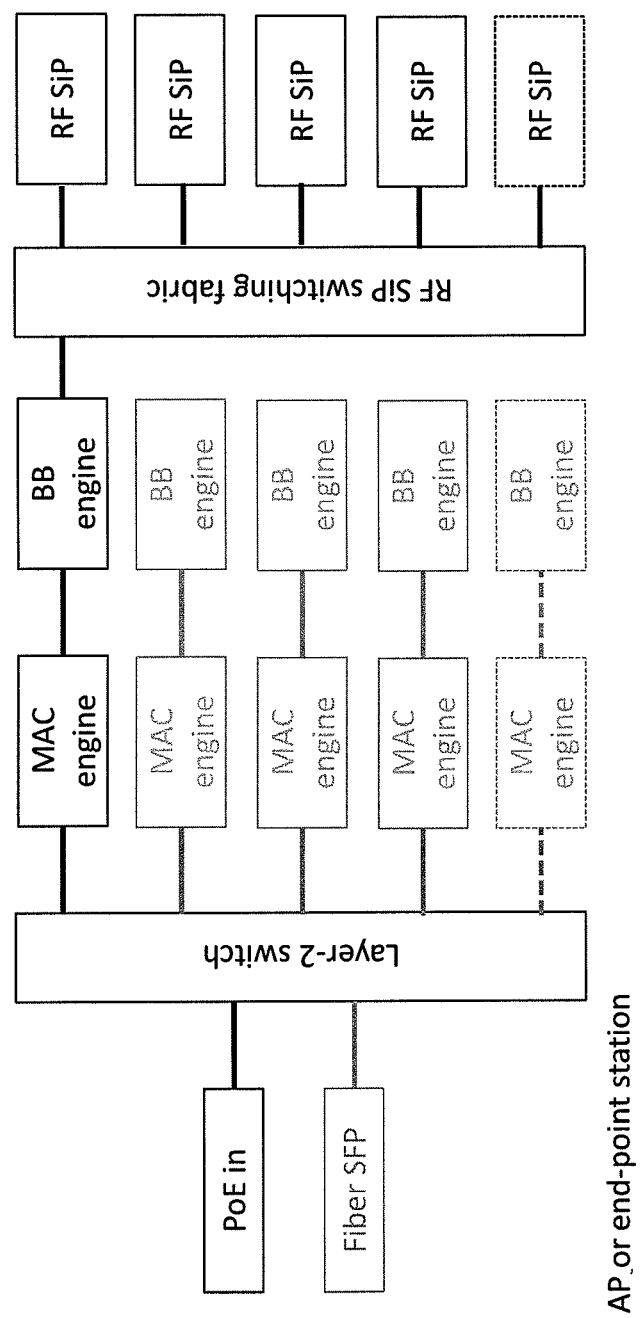
Figure 3J:
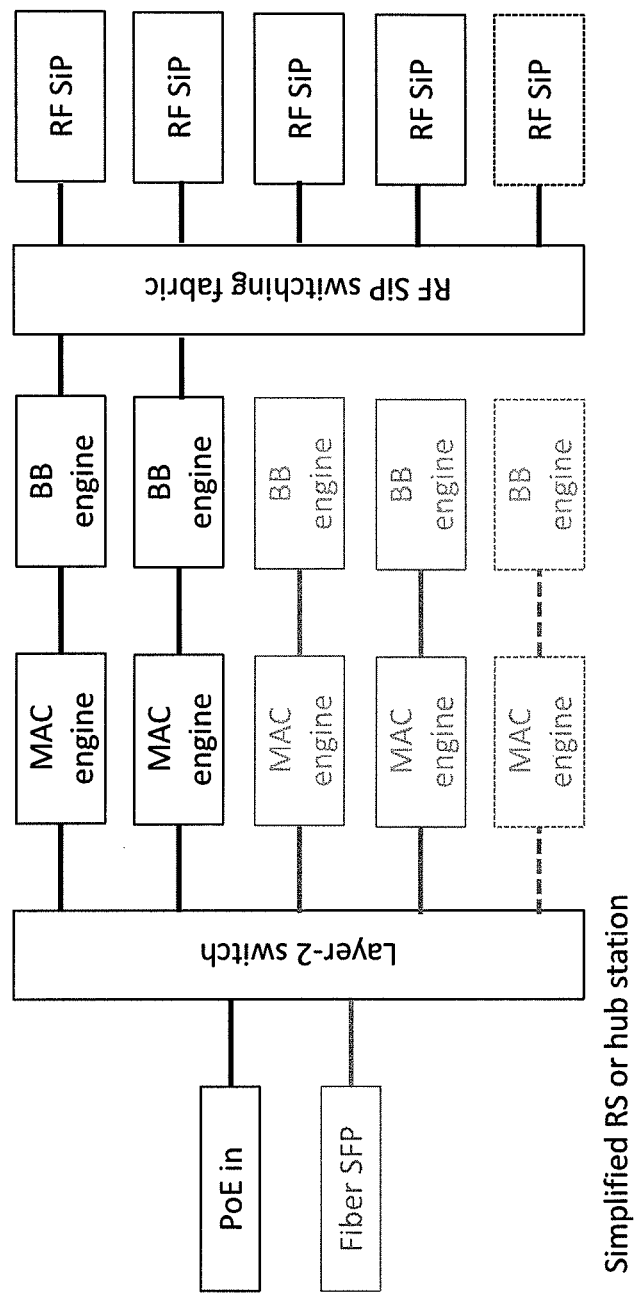
Figure 3K:
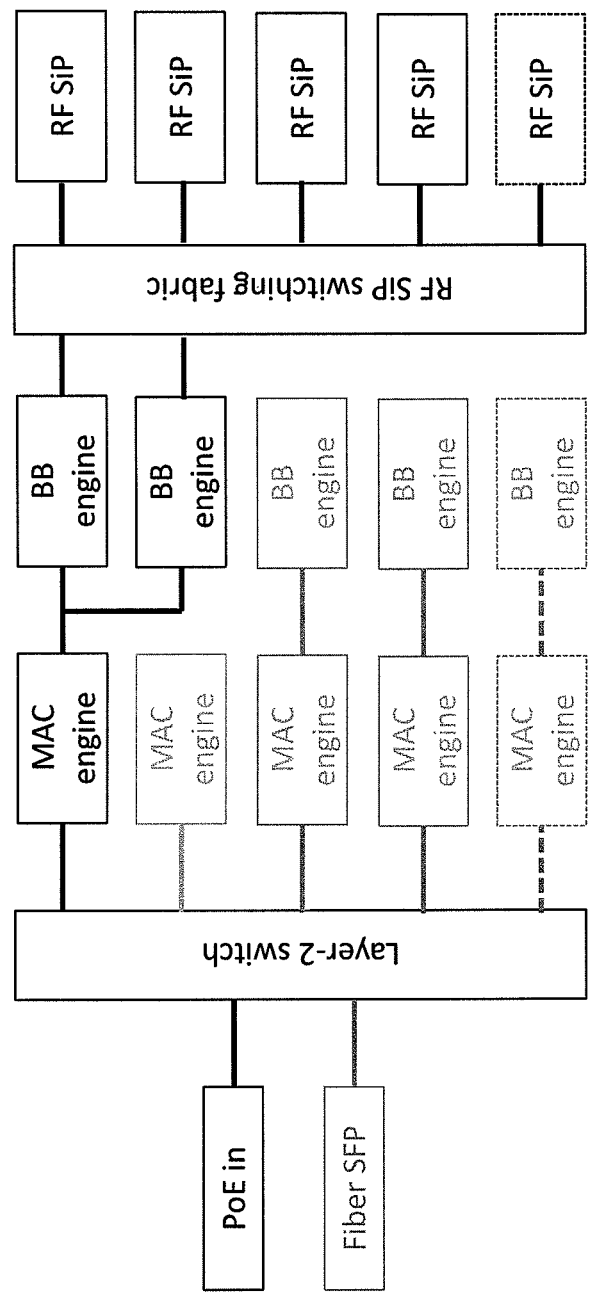

Referring to FIG. 3K, the MAC engine may also interface with multiple baseband engines, such that it is controlling more than one instance of the physical layer. In this case, the MAC engine is able to efficiently control the forwarding of frames over links controlled by the two baseband engines.

In general the operation and interaction between the wireless "beam-aware" MAC, baseband physical layer and RFIC enables the "beams" to become analogous to "ports" in a wired layer-2 Ethernet switch, with the wireless MAC layer managing the efficient forwarding of frames from one "port" (which is actually a "beam") to another.

In addition, the functions of the MAC layer support auto discovery of other nodes and maintenance of wireless links found to other nodes without user intervention. The MAC layer also supports the configuration of appropriate frame and packet forwarding or configuration of tunnels to aid forwarding of frame and packets over multiple wireless links between the source and destination node in the wireless network. Auto discovery is supported by nodes that are established and operating in the network transmitting "beacons" or signals that identify their presence, such that nodes wishing to associate with the next node can learn of nodes to which they can gain access to the network. As the beamforming is used by the transmitter, this involves having nodes attached to the network "beam sweeping" the transmission of the beacon. This is achieved by transmitting the beacon multiple times, over a period of time, each time sending it to the baseband processing engine for transmission using a different beam ID (or AWV). The receiver typically listens for such transmissions using either a quasi-omnidirectional receive mode, or some form of coarse antenna beam to enable it to hear the beacon. As full optimal receive side beamforming is typically not available, the beacon is sent using very robust transmission approaches so that it can be received by a node that is not implementing high gain receive side beamforming. Once the beacon is received and the transmitter and receiver are essentially synchronized, then receiver side beamforming can take place to enable the transmitter and receiver to communicate using more spectrally efficient encoding schemes thereby achieving the target throughput rates.

The layer-2 PPF enables high layer packets sourced from, or destined to, a wireline network to be transported over the wireless link. At a minimum the PPF is responsible for translating Ethernet frames into wireless MAC frames. In the case there are no frames to be sourced from or supplied to the wireless network, the PPF may at a minimum act as a power source using power-over-Ethernet technologies. In the case of a node with multiple modules, then the PPF on one of the modules may provide a "master" function, which may include acting as a layer-2 bridge or switch. Referring to FIG. 3E, the PPF can be associated with one of the four modules shown. The other modules then connect to the first module, which provides the PPF between the fiber small form-factor pluggable (SFP) port, the master wireless module and the other 3 modules connected to it.

The system effectively converts Ethernet frames (and packets encapsulated within them, such as IP and/or MPLS) to mmWave transmission, and performs the reverse process for receiving frames and packets to/from multiple sources. The module is powered either separately or by using a shared Ethernet and power interface, commonly referred to as PoE (power-over-Ethernet).

Referring to FIG. 3D, general elements that comprise a module are shown, and in particular, FIG. 3D shows multiple modules that may be combined to provide the overall functionality required at a hub, relay station, access point or end-point station. FIG. 3E and other, similar Figures show alternative implementations with some unused elements from FIG. 3D shown grayed out. FIG. 3E shows a hub node that provides a backhaul to a wider area network through a fiber SFP port (or other appropriate interface, e.g. copper Ethernet). The node typically contains 2, 3 or 4 60 GHz modules to provide coverage in 2, 3 or 4 directions to achieve up to 360 deg coverage. Assuming 1 Gbps capacity per module, using a module per direction enables hub to provide 4 Gbps of backhaul capacity. The per module capacity can be upgraded over time, for example 2.5 Gbps/module utilizes a 10G fiber connection. Layer-2 PPF, including layer-2 switch or bridge functionality, may be provided by one module operating in "master" mode, with enough interfaces to support PoE in, fiber SFP (or other external network connection) and up to 3 other 60 GHz modules connecting to it. Alternatively or additionally, PPF functionality, including layer-2 switch or bridge functionality, may be provided by a separate module integrated into the AP or pluggable unit, along with the 60 GHz modules.

FIG. 3F shows a relay node which connects to a hub to provide connectivity to the WAN, where power is supplied over a PoE port. The relay node may include 1 or more modules, depending on total "field-of-view required". One implementation can contain five modules: four to provide north, east, west, south coverage, and one to provide upward looking coverage to rooftop mounted nodes. The relay module can operate in half or full duplex mode, depending on configuration:

Full duplex relay with full duplex links: Module 1 can be communicating with an AP, while Module 2 is relaying frames to/from the hub;

Full duplex relay with half duplex links: Module 1 can be receiving from an AP while transmitting to the hub (or transmitting to the AP while receiving from the hub);

Half-duplex relay with full duplex links: Module 1 can be communicating with the AP at one point in time, then relaying frames to the hub at another point in time; and Half duplex relay with half duplex links: Module 1 is either transmitting or receiving to/from the AP or node, alternating in time between direction and transceiver function.

FIG. 3H shows an AP or endpoint station, which connects to a hub/relay to provide connectivity to the WAN. The AP or endpoint station may include 1 or more modules, depending on total "field-of-view required". One implementation can have one module that with the AP backhaul "window" or pluggable module roughly pointed in the direction of an RS or hub. PoE then provides the power as well as the port of connection to the host access point.

FIG. 3I shows another example of an AP or endpoint station, which includes multiple RF SiPs, but one MAC and baseband (BB) engine. The layer-2 PPF then allows the MAC and BB engine to be connected to any one RF SiP to enable communication in a given direction (e.g. either North, East, South, West, or even upwards). This example enables full field of view associated with a hub, but without the cost/complexity/power consumption associated with having to fully populate 4 or 5 full modules worth of components. The BB engine then controls the RF SiP switching fabric to ensure the appropriate RF SiP is configured for transmission or reception of any particular frame.

FIG. 3J shows a simplified RS or hub station. The RS or hub station can populate a full range of RF SiPs to provide wide area coverage without populating the same number of MAC & baseband (BB) engines to implement a reduced complexity RS or hub. For example, if a RS only ever needs to send data to one "superordinate" station and communicate with one "sub-ordinate" station at any one point in time, but needs full field of view coverage, then 2 MAC & BB engines can connect to the RF SiP switching fabric to enable flexibility in how the MAC engines connect to an RF SiP to send/receive frames in a given direction.

FIG. 3G shows an example of an RF SiP architecture, which contain either one or two antenna arrays comprised of multiple antenna elements. Each RF SiP may comprise one or more RFICs, and each RFIC may be capable of transmit, receive or both transmit and receive operation. Each array may comprise one or more sub-arrays of antenna elements with each sub-array driven by one transmit or receive chain of an RFIC. In the case multiple RFICs are used, and more than one RFIC is operating in transmit or receive mode at the same time on the same channel, then in order to for the two RFICs to effectively increase the gain of the array, then additional combining of signals is required either prior to or in the baseband engine, depending on whether the baseband engine is capable of interfacing to multiple RFICs. Alternatively the two or more RFICs that are operating in the same mode may be configured through software to work independently to form beams in different directions to enable simultaneous communication with more than one other node. As such, the "RF SiP" and "array" is combination of multiple RFICs and/or sub-arrays of antenna elements that are packaged in a variety of ways to provide the integrated RF SiP. One such packaging approach is to include the RFIC silicon die(s) inside conventional integrated circuit package(s) (e.g. a ball grid array (BGA)) that are then mounted on to an appropriate substrate that contains the array elements. Alternatively the dies are directly bonded to the substrate. Overall the approach of using multiple RFICs in an RF SiP and sub-arrays in an array enables a practical trade-off between the number of transmit and/or receive chains (and hence components) per RFIC, the number of RFICs, and the number of elements per sub-array, which in effect enables a trade-off between overall cost, size, power consumption, beam width, steering range of the beam and performance.

As well as supporting half-duplex operation with time division duplexing, two arrays can support full duplex link operation, or full duplex relay/half-duplex link operation using frequency division duplexing. Full duplex link operation is achieved by a transmit (Tx) and receive (Rx) array pointing to the same node and allowing packets to be transmitted and sent at the same time. Frequency division full-duplex (FDD) operation is supported without the need for analog domain channel or sub-band filter, commonly referred to as a duplexer or diplexer, and typically required in any FDD communication system that has to share certain elements of the transmitter or receiver (e.g. antenna). Due to the high-level of integration proposed and the operating frequency, it is possible to ensure sufficient isolation between the transmitter and receiver components and antenna arrays to prevent the transmitted signal interfering with the received signal in the analog domain. In light of this, transmitted signals may be filtered from received signals entirely in the digital domain.

Isolation between transmitter and receiver components is achieved in various ways. Isolation may be achieved by using separate transmit and receive antennas that are physically separated. At mmWave frequencies the separation does not need to be large due to the short wavelength. Isolation may also be achieved using beamforming to ensure that both the transmit and receive arrays are focused away from each other. Isolation may further be achieved by using robust modulation and coding schemes, which can be used due to the abundance of bandwidth, meaning that any residual leakage of energy after processing in the digital domain has minimal impact on receiver performance. For example, separation of a few centimeters provides at least 30 dB of isolation; in addition, with beamforming applied, the transmit and receive sidelobes can be ~30 dB attenuated. The net result is a combined analog domain isolation of >90 dB which is of the order of that provided by a traditional duplexer. Further isolation could be provided by building low-profile "wall" (e.g. a sufficiently designed metallic, or other material, insulator) between the two arrays to reduce the effective coupling of signal between the two arrays. It is possible that as well as enabling improved operation (e.g. at higher order modulation and coding schemes, or reduced digital domain processing requirements) on adjacent frequencies, that with sufficient additional attenuation by a wall that isolations of >100 dB could be achieved enabling full duplex operation where the same channel is used for both transmit and receive.

Full duplex relay operation is achieved by the Tx array pointing to one node while the Rx array points to the other node; the Tx/Rx arrays then alternate over time to allow relaying of frames in both directions. This mode of operation can be particularly beneficial in networks with highly asymmetric traffic: e.g. downlink centric where data is generally flowing from hub to relay to AP to end-point. It also allows a module pointing in a coarse direction that needs to perform relay function to operate efficiently (e.g. hub and an AP are both North of the RS). Alternatively if only one array is available, or only one array can be active at any one point in time, then half-duplex operation can be supported.

In the general sense, due to the lack of an analog duplexer or diplexer, the frequency channel used for transmit and that used for receive can be defined in software, as well as whether the system is operating in full or half duplex, with frequency or time division duplexing, such that software-defined duplexing (SDD) is enabled.

Figure 5:
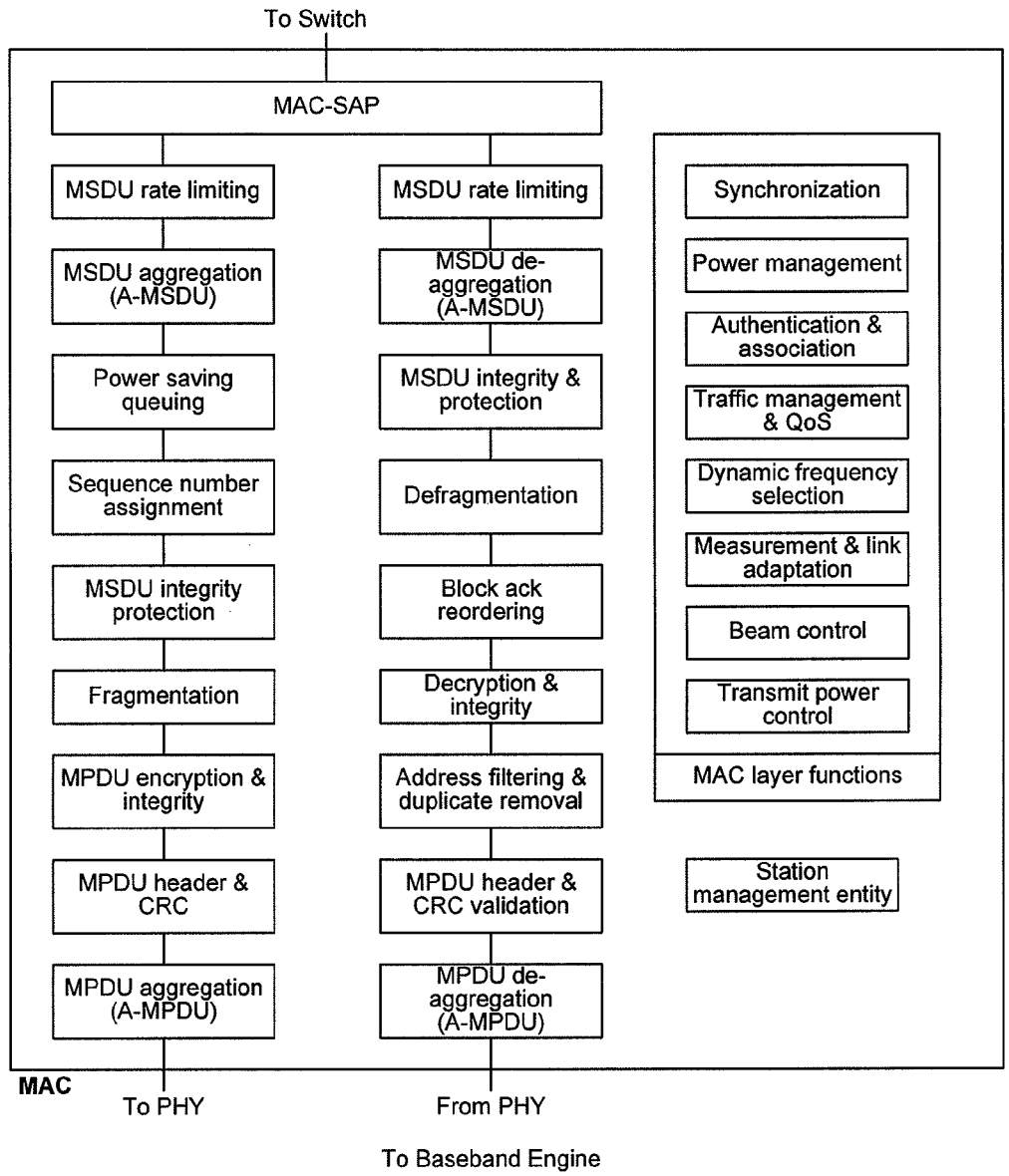
FIG. 5 is a diagram showing medium access control (MAC) layer data plane architecture and its key functions.

FIG. 3K shows an example of a different type of module that has more than one baseband processing engine associated with a MAC engine. While FIG. 3K only shows two baseband processing engines associated with a single MAC engine, a further extension of this approach is to generally incorporate all MAC functionality for multiple baseband processing engines into one MAC engine. This enables the efficient forwarding of frames between wireless channels being managed by different baseband processing engines, as the MAC engine can directly forward frames from one baseband engine to the other without having to forward them through the layer-2 switch:

FIG. 5 shows the functional blocks of the MAC processing engine of FIG. 1, which is connected between the PPF and the baseband engine. The functional blocks of FIG. 5 are generally self-explanatory based on the detailed description provided herein. The MAC processing engine of FIG. 5 employs a MAC layer data plane architecture associated with a node implementing the IEEE 802.11 protocol, or similar. The data plane translates frames from the logical link control (LLC) layer entity to MPDUs for transfer to the physical layer (PHY) through the PHY-SAP, and performs similar reverse operations on the receive path. FIG. 5 also shows control and management plane functional blocks that may be included in a node. These functional blocks are responsible for controlling the data path operational behavior, and the physical layer behavior, and they are also responsible for transmitting and receiving control and management frames to and from other stations to support functions such as enabling and maintaining access to the network.

Overall, the functional blocks shown in FIG. 5 are generally common among, e.g. APs, and the data-path is fixed, as per the standard (e.g. IEEE 802.11), as this is what enables a node from one vendor to send data packets to another. Specifics of some the algorithms behind the control plane functions can be implementation specific, such as beam control, link adaptation, and dynamic frequency selection. In addition, the MAC processing engine may employ MAC-layer forwarding of MPDUs as noted here for multi-hop point-to-multipoint relay functionality.

Figure 6:
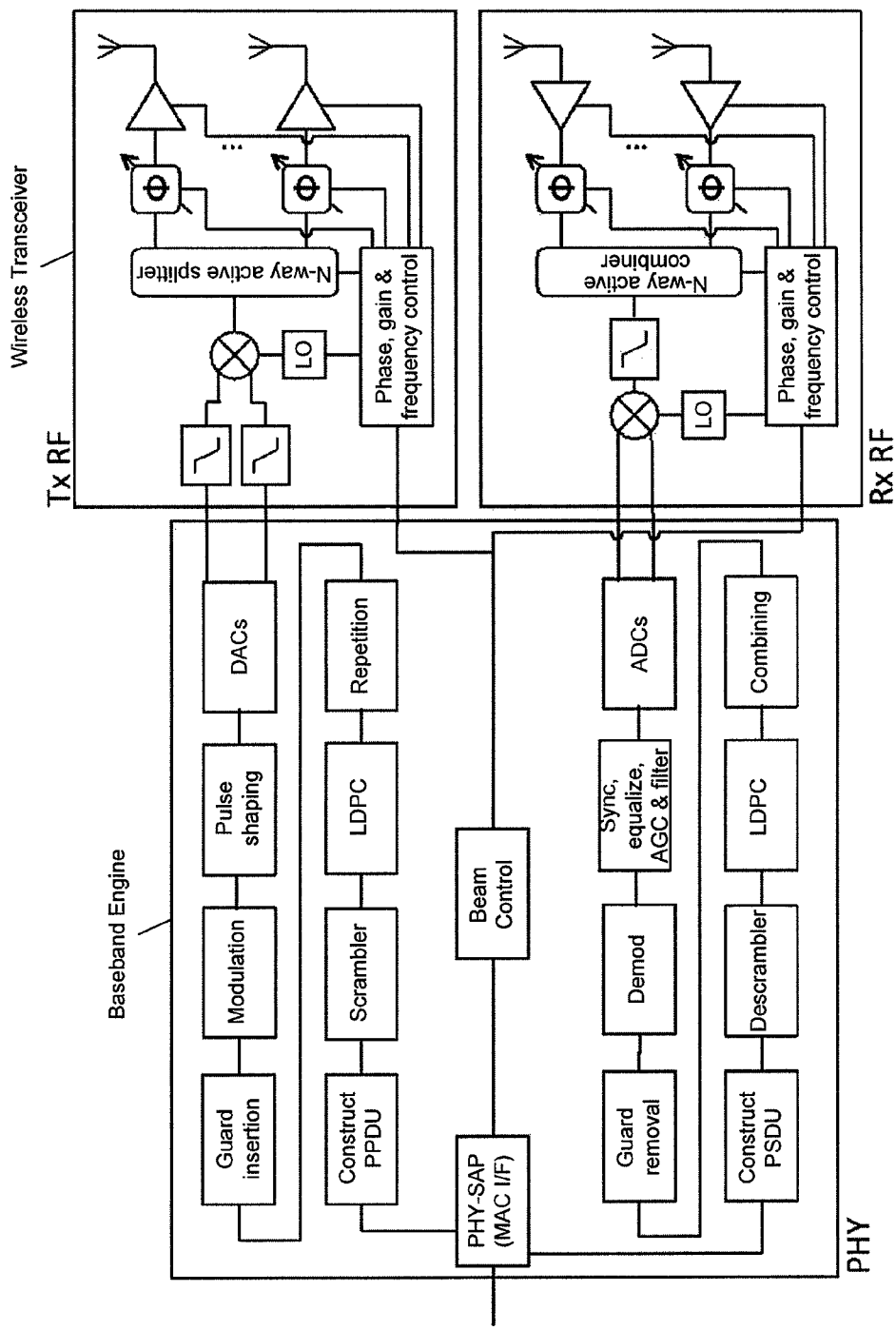
FIG. 6 is a diagram showing physical (PHY) and radio frequency (RF) architecture.

FIG. 6 shows the functional blocks of the baseband engine and radio transceiver of FIG. 1. The functional blocks of FIG. 6 are generally self-explanatory based on the detailed description provided herein. FIG. 6 shows PHY data plane (i.e. the BB processing engine) and RF layer architecture (i.e. radio transceiver) associated with a node that is implementing the single carrier physical layer IEEE 802.11 protocol. The RF architecture uses direct conversion from baseband to RF and employs phase shifting at RF. In some implementations, other approaches are used, such as a two stage superheterodyne architecture under which a signal is converted from baseband to an intermediate frequency (e.g. 15 GHz) and then to the RF frequency. The phase shifting and gain control as part of forming a beam may be performed at baseband or in the local oscillator path. This phase shift and gain control at baseband or in the local oscillator path may be either the entire shift and gain required to form a beam, or could be in part applied at the baseband or local oscillator path in addition to phase shifting and gain control at intermediate or RF stages.

Overall, the functional blocks shown in FIG. 6 are generally common among, e.g. APs, though the operation of the encoding/decoding (LDPC) block may differ by implementations. However, the module, such as the PPF, and MAC and BB engines, may generally employ off-the-shelf silicon, upon which is layered software/firmware to support for efficient multi-hop point-to-multi-point relay.

The system supports centralized operations and maintenance (OAM) and facilitates the node and architecture to be self-organizing, in the sense that the network of nodes will be a dynamic self-organizing network (SON) supporting multi-hop point-to-multipoint or multi-hop mesh topologies. To facilitate this software defined networking (SDN) approaches may be utilized, including the use of OpenFlow, such that some of the control plane functionality required to support the operation of the node in a network of nodes is provided by a centralized controller. In this architecture each node presents an application programming interface (API) to allow the centralized function to control the behavior of the node within the network of nodes.

The system described above includes several elements, combined together, to create a new type of wireless communications system (hardware and embedded software) that is able to provide low latency, Gbps communications over much longer ranges than may otherwise be possible. In addition, the approach of using centralized OAM, dynamic SON and SDN (and SDD in the case frequency division duplexing is required) enables a large network of numerous nodes to be deployed and operated with ease, and for the network to be able to self-optimize based on traffic patterns and changes in topology caused when certain wireless links become available or unavailable between any two nodes within the network.

The system can be realized using a number of system-on-chip (SoC) and system in package (SiP) devices (integrated circuits and systems) mounted on to a printed circuit board (PCB). Alternatively the various elements can be implemented on separate silicon dies and integrated into one or more SoCs or SiPs, and ultimately all the elements can be implemented on a single silicon die and packaged in a SiP.

The hardware module described above forms a basic building block that has multiple features, including: capable of being combined with access nodes either as an integral module, or as a field pluggable device, to provide metro-wide transport connectivity; capable of being packaged with one or more other modules to provide a "relay" function to allow two or more access nodes to connect; capable of being packaged with other modules to provide a "hub" function to allow nodes to connect to a fiber link to the core network; etc.

A node with multiple modules may incorporate all of the elements described on each module, or one of the modules can behave as a master module, itself driving, for example, just the PHY and/or RF element on one or more other modules.

One benefit of such a solution is that it enables a number of very low cost, high capacity simple wireless links to be provided, leveraging highly integrated and relatively low-cost electronics, but, by relying on intelligence in the software residing on the modules, enables dynamic, adaptive, low latency and resilient multi-hop point-to-multipoint or multi-hop mesh networks to be formed. As such it enables the potential to offer a much lower cost per GB solution, but also enables the easy deployment of a very resilient network.

One of ordinary skill in the relevant art will recognize that, although not required, aspects of the invention may be implemented as computer-executable instructions, such as routines executed by a general-purpose data processing device, e.g., a server computer, wireless device, personal computer, etc. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on tangible computer-readable media, including magnetically or optically readable computer discs, hard-wired or prepro-grammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The system may work with various telecommunications elements, include 2G/3G/4G network elements (including base stations, Node Bs, eNode Bs, etc.), picocells, etc. Alternatively or additionally, the network includes an IP-based network that includes, e.g., a VoIP broadcast architecture, UMA or GAN (Generic Access Network) broadcast architecture, or a femtocell broadcast architecture. (Unlicensed Mobile Access or UMA, is the commercial name of the 3GPP Generic Access Network or GAN standard). Of course, VoIP using WiFi access points (APs) or other nodes of an IEEE 802.11 network may be used.

Optimized Forwarding/Routing: General System

Using a standard layer-2 association procedure (e.g. IEEE 802.11), a first wireless station attaches to a second wireless station that is acting as a wireless hub station (HS), such that it provides connectivity to a wide area network (WAN). During association the first and second wireless stations learn of each other's wireless MAC addresses. The first station switches into an access point (AP) mode to allow other stations to attach to it in a point-to-multipoint or mesh manner, while also retaining connectivity to the HS. This first station is referred to as a relay station (RS) from herein.

In a similar manner, a second station attaches to the RS and associates with it using standard association procedures. The second station then switches into AP mode itself to allow other stations to attach to it. The second station is referred to as the AP.

A third station attaches to the AP in order to receive broader (e.g. IP) connectivity to the WAN, through the point-to-multipoint multi-hop network. The third station is referred to as the endpoint station (ES).

The ES may now connect to the WAN network by communicating to the HS through the AP and RS, although the HS and ES do not have direct connectivity or even knowledge of each other.

Figure 7:
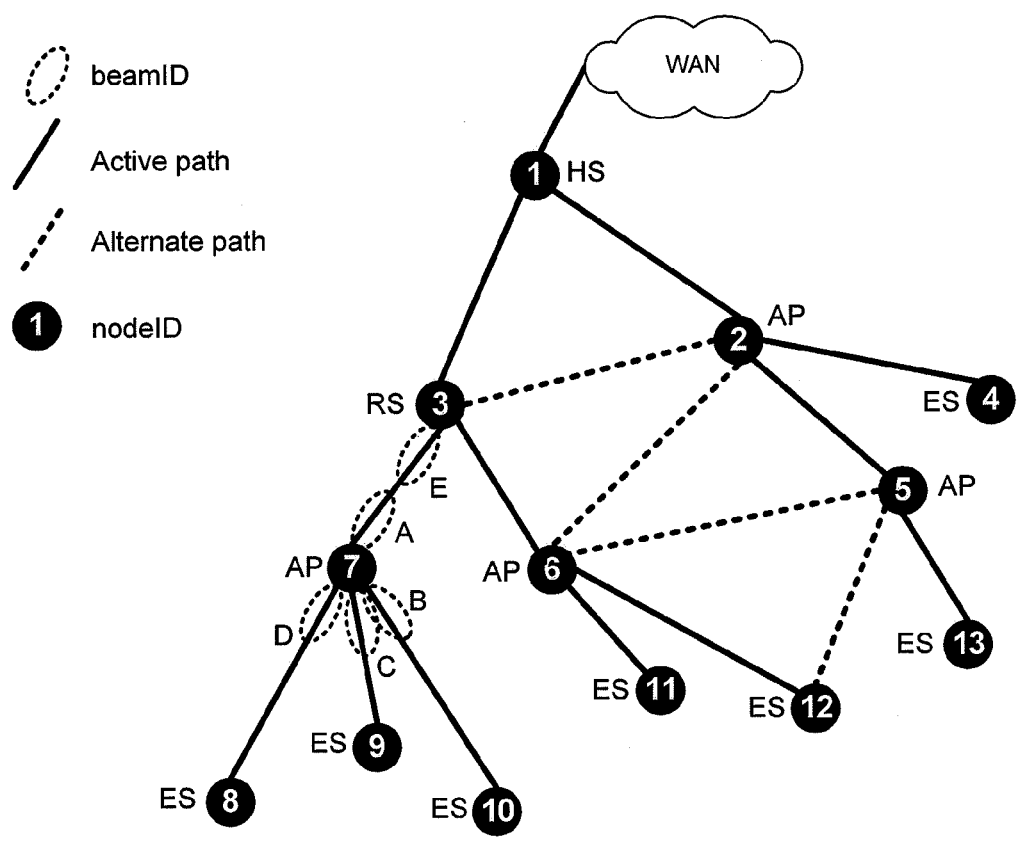
FIG. 7 is a network diagram illustrating multiple paths between nodes in a multi-hop point-to-multipoint network.

A number of other nodes connect, and the network shown in FIG. 7 is constructed, as an example. Note that shown are both primary and alternate connections between nodes. In addition an AP can act as an RS, allowing ESs and other APs to connect to it. In addition the topology shown in FIG. 7 could be extended such that the alternate connections between nodes are also active, thereby facilitating a multi-hop mesh network as an extension to the otherwise shown multi-hop point-to-multipoint network.

The following sections describe, with reference to the example network architecture of FIG. 7, various protocols and procedures that enable nodes to connect, form primary paths of communication between nodes, and manage those communication paths should changes in topology occur.

Figure 8:
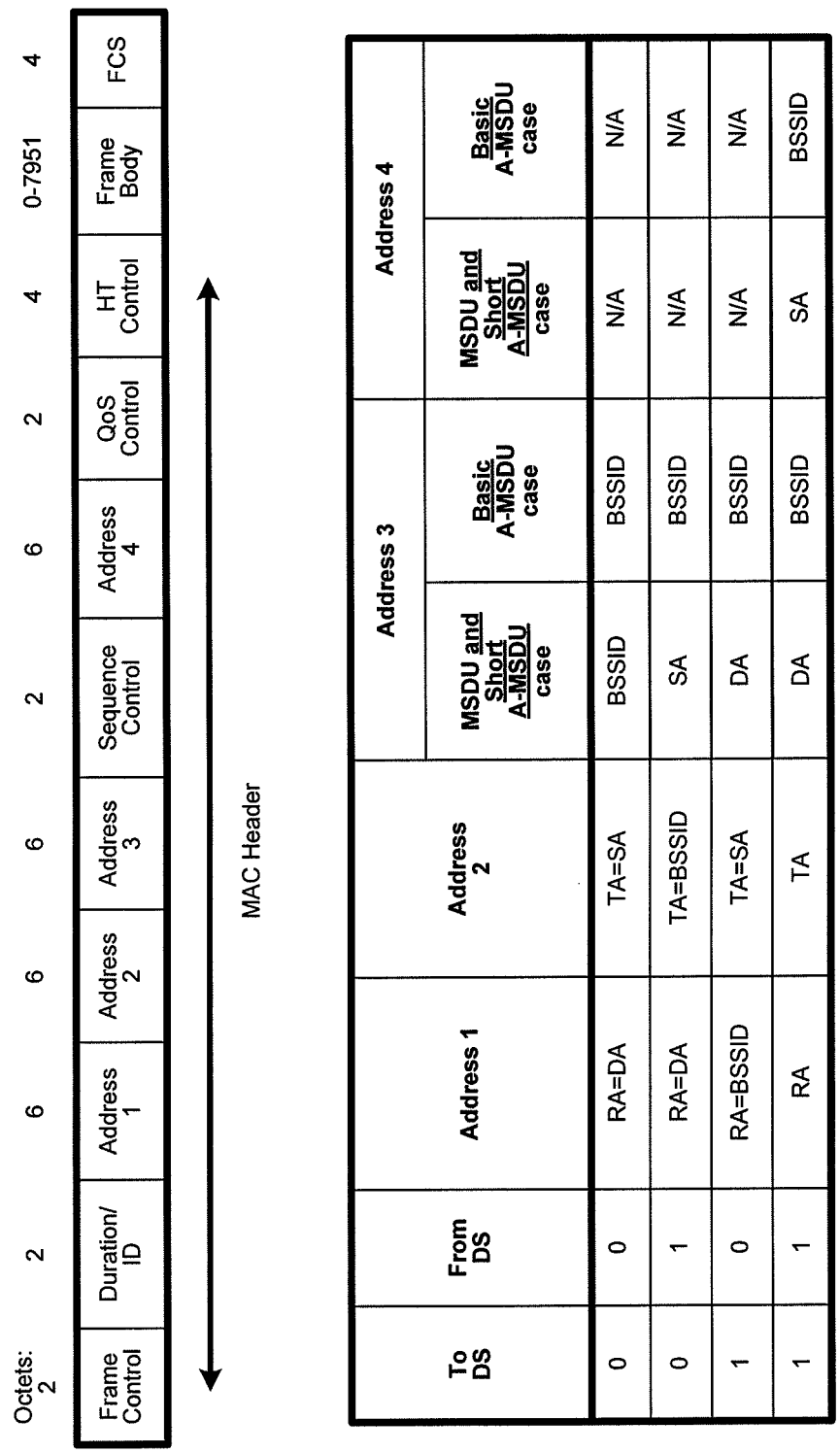
FIG. 8 shows an example of a frame structure (with MAC header) and details of address fields.

In general the functionality is explained in reference to extensions to a wireless system using protocols and frame formats similar to an IEEE 802.11 based system. However, this is not intended to restrict these extensions to only this type of system. In such a system any layer-2 frame typically has up to four addresses associated with it, to support the forwarding of such a packet across multiple wireless links between a source and destination. In the case of IEEE 802.11, the frame structure and details of the addresses from the MAC header are as shown in FIG. 8. While the description generally relates to the operation in a multi-hop network using point-to-multipoint communication in the "downstream" direction, from a hierarchical point of view, it is not intended that the functionality described is restricted for use in only these types of topologies. Specifically it can also be similarly applied to a multi-hop network using mesh communication between nodes.

In the case of using a "distribution system" (DS) to support the forwarding of packets across multiple layer-2 links between a source address (SA) and a destination address (DA), then the four addresses are used to indicate source and destination, as well as the receiver address (RA) and transmitter address (TA) to indicate the address of any two nodes that directly communicate to facilitate transmission across the network.

As an example, with reference to FIG. 7, the SA can be the ES with address 8, and the DA can be HS with address 1. When a frame is being sent between the ES and HS, then at AP address 7 a frame transmitted to RS address 3 may be constructed with:
SA=8
DA=1
TA=7
RA=3

Forwarding Table Construction a) General Procedure in a Multi-Hop Point-to-Multipoint (PMP) Layer-2 Network with Beamforming In a network where a frame will potentially have to transition through more than one node to reach its end destination, a forwarding table is used at intermediate nodes to record how packets received for a particular destination other than itself should be managed.

Assuming, in the general sense, that a higher protocol layer at the ES wishes to access an application or service hosted in the WAN (or even at another ES) then a packet will be generated at the ES for transmission to a particular server. Assuming this server has a known IP (or other network protocol) address, the ES needs to find out how to address layer-2 frames across the network in order for the frames (and hence packets) to be correctly routed to the HS and beyond into the WAN (or to the ES where the server is located).

In this example, IP is assumed to be used at the network layer to provide connectivity to the destination server, however it is not intended to restrict the description of how the system operates to only the case of transport of IP packets.

The following steps are executed by the nodes in the wireless network:

1. At the ES a higher layer application, service or protocol wishes to communicate with its peer at a particular IP address, referred to as the target server (TS) in this example but, assuming no pre-configuration of the network, the ES does not know the associated layer-2 address for the TS. It can broadcast layer-2 frames over the entire layer-2 network, however this may be very inefficient, so the ES invokes the address resolution protocol (ARP) to find the layer-2 address associated with this layer-3 IP address.
2. The result is the generation of an ARP request frame with destination MAC address FF:FF:FF:FF:FF:FF (broadcast), containing the IP address of the TS for which the MAC address is to be resolved
3. This frame arrives at the ES's wireless MAC sublayer, through the MAC_SAP, with source address equal to the ES's MAC address and destination address equal to the broadcast MAC address. The behavior of the ES's wireless MAC sublayer is to transmit this frame to the AP, as it does with all frames. It encapsulates the ARP frame in a wireless MAC header with the following configuration:
   a. Transmitter address (TA)=ES address (addr)
   b. Receiver addr (RA)=AP addr
   c. Destination addr (DA)=broadcast addr
   d. In the case of using the IEEE 802.11 protocol, the "ToDS" field may be set.
Note that the ES cannot perform the broadcast function itself because i) it is assumed that the medium is under the control of the AP; ii) it may not have beamforming vectors learned for the other nodes it can potentially reach; and/or iii) some nodes available through the AP might be "out-of-range" to the ES. Therefore the ES requires the AP to facilitate the broadcast of the frame, as appropriate, on its behalf. Conversely, in the case of a multi-hop mesh network, the ES would be able to broadcast the frame to all nodes with which it is associated, however if the TS is behind a node more than one hop away, the same multi-hop forwarding procedure, and hence forwarding table construction procedure, would be required.
4. The AP receives the frame and notes the need for broadcasting due to the setting of DA. The AP then does one of the following:
   a. If the AP supports proxy-ARP: it inspects the payload of the frame, notes it is an ARP packet and will respond if it knows the MAC to IP address mapping. In which case the response frame (including the ARP packet) will be sent with:
      i. TA=AP addr
      ii. RA=ES addr
      iii. SA=TS addr
      iv. In addition if the IEEE 802.11 frame format is used, then "FromDS" may be set. This enables the ES to know it needs to use the distribution system to communicate with the TS.
   b. Otherwise, if proxy-ARP is not supported or the mapping is unknown, then the AP is responsible for forwarding this frame on. So the AP generates a frame with the following parameters:
      i. TA=AP addr
      ii. RA=RS addr
      iii. DA=broadcast address
      iv. SA=ES addr
      v. If the IEEE 802.11 frame format is used, then "ToDS" and "FromDS" may be set
In addition, if there are other ESs connected to the AP, then a similar frame may be sent to each of these either in a unicast, multi-cast or broadcast manner to ensure that all nodes under the AP receive the ARP request.
5. The RS receives the frame and performs the same function as the AP. At this point the RS does two things:
   a. Makes an entry in its layer-2 forwarding table that maps the ES addr to the AP addr, such that it knows a frame destined for ES addr needs to be sent with RA=AP addr:
      i. Dest=ES addr; RA=AP addr
   b. Assuming it cannot respond to the ARP request itself, it forms a frame to the HS with:
      i. TA=RS addr
      ii. RA=HS addr iii. DA=broadcast MAC address
iv. SA=ES addr
v. If the IEEE 802.11 frame format is used, then "ToDS" and "FromDS" may be set.

In addition, if there are other ESs or APs connected to the RS, then a similar frame may be sent to each of these either in a unicast, multi-cast or broadcast manner to ensure that all nodes under the RS receive the ARP request 6. The HS receives the frame and performs the same function as the RS. Assuming no support for proxy ARP, the hub constructs an appropriate frame towards the WAN, depending on whatever layer-2 protocol is being used beyond the HS. The HS notes in its layer-2 forwarding table that DA=ES addr can be reached by setting RA=RS addr 7. Eventually the ARP packet reaches a node that knows the mapping of IP address to MAC address, and a response is generated. The response arrives at the HS as a frame with DA=ES addr and SA=TS addr. The HS uses the entry in its forwarding table to resolve that DA=ES addr requires RA=RS addr, and constructs the following frame header:
a. TA=HS addr
b. RA=RS addr
c. DA=ES addr
d. SA=TS addr
e. If the IEEE 802.11 frame format is used, then "ToDS" and "FromDS" may be set 8. The RS receives this frame and knows from its forwarding table that ES addr requires RA=AP addr, and so it constructs the following frame:
a. TA=RS addr
b. RA=AP addr
c. DA=ES addr
d. SA=TS addr
e. If the IEEE 802.11 frame format is used, then "ToDS" and "FromDS" may be set The RS also adds an entry in its forwarding table that DA=TS addr is reached by setting RA=HS addr.

9. Finally the AP receives the frame and transmits the following frame to the ES:
a. TA=AP addr
b. RA=ES addr
c. SA=TS addr
d. If the IEEE 802.11 frame format is used, then "FromDS" may be set 10. On receiving this frame the ES knows the TS MAC address, and due to the setting of "FromDS=1" it knows it must reach this node through using the distribution system in the future, so will set "ToDS=1" in any frames to the TS.

If proxy ARP had been used at any point, then the knowledge of the ES address and forwarding table may only have been built as far into the network as where the proxy ARP function operated. For example, consider proxy ARP performed by the RS, in this case the HS may not have received the frame in step 6. Therefore the following procedure will take place during transmission of the first frame from ES to the TS:

1. ES sends a data frame with header:
a. TA=ES addr
b. RA=AP addr
c. DA=TS addr
d. If the IEEE 802.11 frame format is used, then "ToDS=1"

2. This frame gets translated at the AP to include both "ToDS" and "FromDS" set=1. So the following frame is sent to the RS:
a. TA=AP addr
b. RA=RS addr
c. DA=TS addr
d. SA=ES addr 3. The RS will send the following to the HS:
a. TA=RS addr
b. RA=HS addr
c. DA=TS addr
d. SA=ES addr 4. The HS (as all nodes do in general) monitors the SA field to see if an unknown address is found. In this case it is, so it places an entry in its forwarding table that DA=ES addr is reached by RA=RS addr.

In addition, had the frame arrived at another ES (e.g. ES2) where the IP address was found, using either a multi-hop point-to-multipoint or multi-hop mesh network topology, then the operation described above may be used, and the nodes between ES1 and ES2 may behave in the same was as described for the HS, RS and AP.

Figure 9:
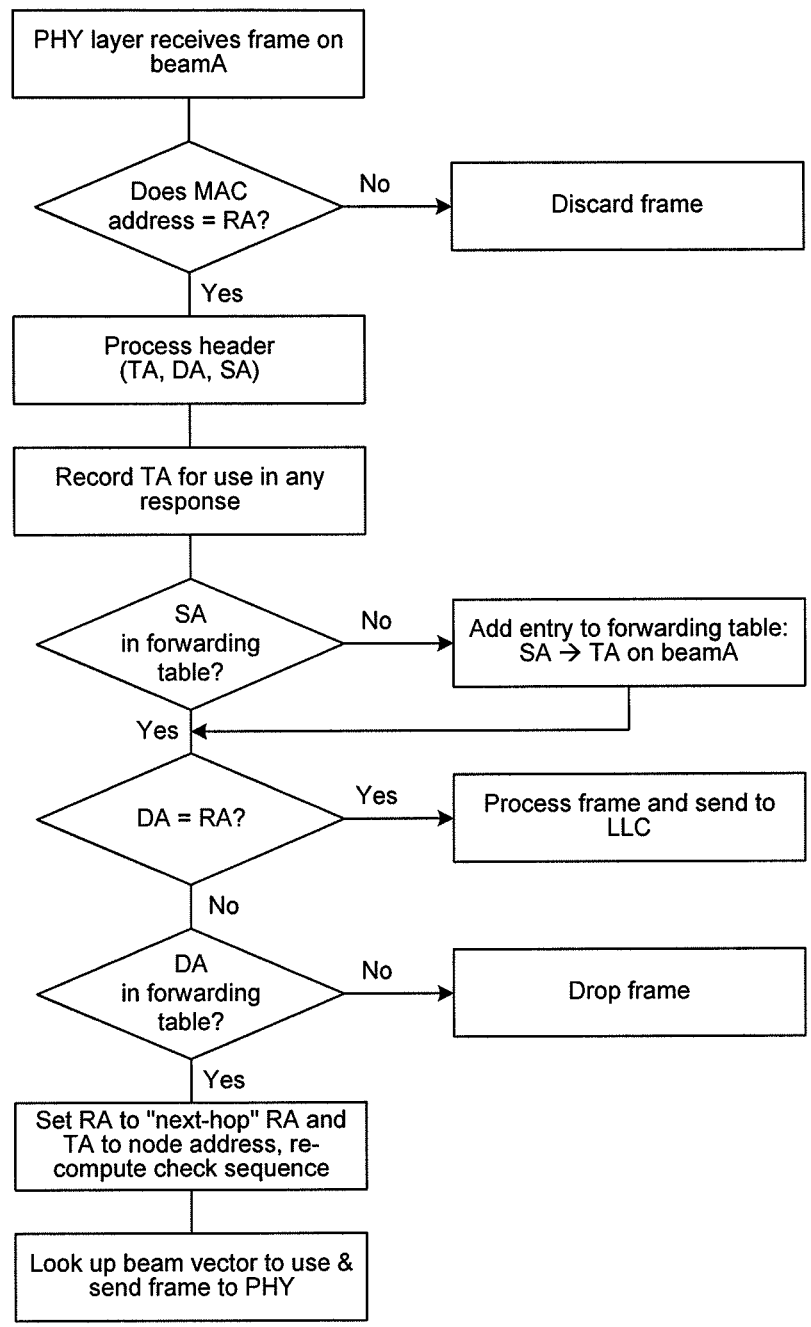
FIG. 9 is a flow chart illustrating a forwarding function procedure at each node in a multi-hop point-to-multipoint or multi-hop mesh layer-2 wireless network.

In general the above procedure requires the following behavior, as summarized in FIG. 9, at each node:

1. The PHY layer of a node receives a frame on beamID=beamA, and informs the MAC of frame reception;

2. The MAC inspects the RA field of the header to see if it is the intended recipient and if so, processes the frame header (learning TA, DA and SA);

3. Next it inspects the TA to find the address to which it must send any required ACK or other type of response or feedback;

4. Next it inspects the SA to see if it has an address entry in its forwarding table, if not then it knows that SA can be reached through TA on beamA and adds this to the table;

5. If DA is not equal to RA then it knows it needs to retransmit the frame, in which case it looks up "next hop" RA to use for the DA from its forwarding table (if this is unknown then it defaults to sending the frame in the direction of the superordinate node, if this feature is allowed, otherwise it will not forward the frame);

6. The node then manipulates the header to replace RA field with the "next-hop" RA address found from look up, and changes the TA to its own MAC address;

7. The node re-computes the frame check (or header) sequence, such that the frame is ready for retransmission; and, 8. The node looks up the beamID associated with the RA, and sends the frame to the PHY layer for transmission on the appropriate beam.

Note that in the case of DA equal to the multi-cast or broadcast address, then the MAC layer may send a frame on a number of beam vectors to effect a broadcast, and this may involve transmitting the frame multiple times, for example in this case the lookup associated with the broadcast RA would return a set of beamIDs to use, rather than a single ID. In this case, the node would send to the PHY layer multiple versions of the frame, one for each beamID on which the frame needs to be sent. Alternatively, the MAC may just indicate to the PHY that a single frame needs to be transmitted on a set of beamIDs and certain points in time. In addition the node may manipulate the payload of a frame in step 6), for example it may fragment it. It may also pack the contents of two or more frames into a single frame.

Alternatively the node may inspect the payload of broadcast data frames to determine if a PHY layer broadcast is needed. For example this may not be required for a frame containing an ARP packet, if proxy ARP is being used at that node.

b) Optimization of Forwarding Function in a Wireless Multi-hop Point-to-multipoint or Multi-hop Mesh Network with Beamforming In general the forwarding table is constructed as a list of destination addresses, and a method that should be used to forward frames onwards that are destined for that address. In the case of wireless systems (e.g. IEEE 802.11), the forwarding table is a mapping of destination address (DA) to a receiver address to use (RA), e.g.:

Destination address->Receiver address (aka "Next hop")

So a look up for a destination address returns a "next-hop" receiver address to use, and each destination address on the network requires a receiver address entry in the table.

In a tree-type network (multi-hop point-to-multipoint), the forwarding table size can become large at an HS, or even an RS, and in a multi-hop mesh network, it could also become large at any node. One way to save memory may be to use a vector based look up, e.g. receiver address can be replaced with nodeID, if many destinations are reached through the same "next-hop" receiver, and a separate table can be constructed to map nodeID to receiver address, so the frame header can be constructed. While this can save memory, the downside is that two lookups are needed: DA to find nodeID, and then nodeID to find RA.

Alternatively or additionally, the present system may use a compressed form of RA in the frame header. However this requires a system to manage assignment of compressed address IDs to nodes as they attach, and the length of the ID needs to be carefully selected to balance address space size (which determines number of nodes that can connect to a network), and savings in terms of memory space.

An approach in the case of a wireless beamforming based system is to use an "antenna weight vector or antenna map index" or "beamID" in the forwarding table, such that a look up for a DA returns a beamID that itself infers a set of antenna weights or configuration to be used for the frame transmission. This is somewhat analogous to a wired system (c.f layer 2 switch) that returns a "port" on which to forward the received frame, rather than a specific node address to which to send the frame to. In this case an inbound frame at an RS received on beamA, with DA=addr1 and SA=addr2 may result in the following entry to remember that a frame came from addr2 on beamA:

Destination Beam (port)
addr2->beamA

On receiving this frame, it triggers a lookup for the beam associated with addr1. Assuming the following entry existed:

Destination Beam (port)
addr1->beamB

Then the RS constructs a frame with the following header:
DA=addr1
SA=addr2
RA=broadcast addr
TA=RS addr And instructs the PHY layer to send it on beamB to the next RS. Assuming the next RS receives the frame on beamF, it then checks the DA field to see if it has an entry for this node (addr1) in its forwarding table, if not it drops the frame. If it does have an entry addr1, then it handles the frame appropriately. At the same time it ensures the following entry exists for the SA:

Destination Beam (port)
addr2->beamF

Some benefits with this approach are:

1. forwarding tables only need to contain a mapping of address to beam index (c.f. port in wired networks), thereby reducing memory requirements without compromising lookup time, as it is expected the number of active "beams" at a node is likely very similar to the number of ports at a switch (e.g. 1 to 64, possibly 128); and, 2. header manipulation is minimized when using this approach, as RA, DA and SA are unchanged as RA can be set to null, a special value or omitted in data frames (or other frames that are subject to forwarding) in such a system.

Figure 10:
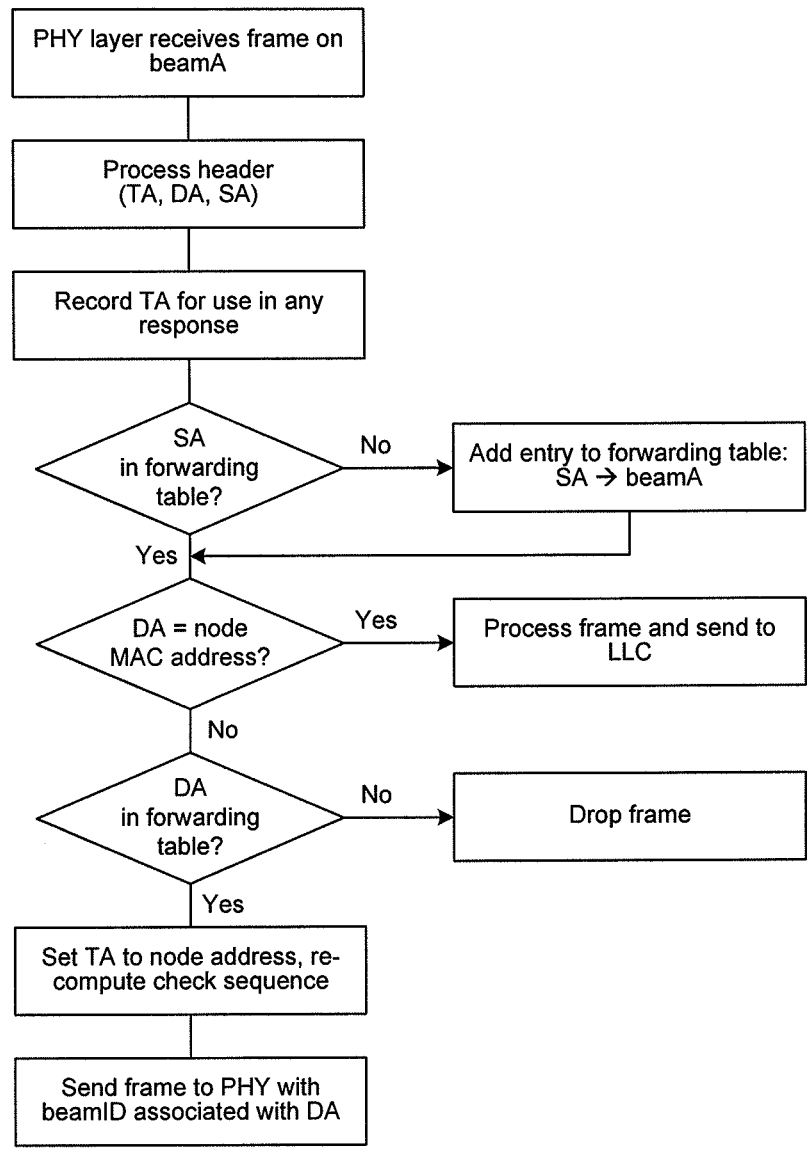
FIG. 10 is a flow chart illustrating an optimized forwarding function procedure at each node in the beamforming multi-hop point-to-multipoint or multi-hop mesh layer-2 wireless network.

In general the above procedure requires the following behavior, as summarized in FIG. 10, at each node:

1. The PHY layer of a node receives a frame on beamA, and informs the MAC of frame reception;
2. Inspects the TA to find the address to which it must send any required ACK or other type of response or feedback, and generates the appropriate frame addressed with RA=TA;
3. It inspects the SA to see if it has a beamID entry in its forwarding table, if not then it knows that SA can be reached through beamA, and adds this to the table;
4. The MAC inspects the DA field of the header to see if it is the intended destination, if not it knows it needs to forward the frame;
5. If it needs to forward, then it looks up the beamID to use when forwarding based on the DA (if this is unknown then it defaults to sending the frame in the direction of the superordinate node, if this feature is allowed, otherwise it will not forward the frame);
6. The node then manipulates the header to replace the TA with its own MAC address;
7. The node re-computes the header check sequence "HCS" such that the frame is ready for retransmission; and,
8. Finally the node sends the frame to the PHY layer for transmission on the beamID found from the forwarding table.

HCS is a sequence that is computed as a function of header content, and then added to the end of the header. A receiver computes an expected HCS based on the received header content and checks that the HCS matches an actual received HCS. If it does not match, it can assume the header was falsely decoded and discards it, along with the remainder of the frame.

c) Zero Header Manipulation Operation

As mentioned above, using beamID for forwarding, rather than RA, prevents the need to change (or use of) the RA in the header, and reduces the complexity of the forwarding function and size of the forwarding table. In essence, the wireless layer-2 system starts to look more like a wired layer-2 system, such as Ethernet, where only DA and SA are used.

A further optimization in a wireless system using "beams" to communicate with nodes is to omit the TA field (or use a special address of "null"), allowing a data frame requiring forwarding to be forwarded without requiring any manipulation of the frame header.

The main purpose of the TA field is to allow the MAC layer to know which node transmitted the frame, and hence to which node any layer-2 ACK or feedback should be sent in response. In the case of a data only frame that is to be forwarded, the only response may be an ACK, in which case the TA field in the received data frame is translated to the RA field in the ACK frame.

While signaling the TA explicitly is the "easiest" way to ascertain the RA for an ACK, any node should implicitly know the transmitter of any received frame in a system that is using scheduling, which is generally the case for any system that uses beamforming, as the two nodes communicating have to co-ordinate the direction of their beams over time such that they are both directing beams to each other when sending/receiving frames. This is unlike a system that uses "omni" or "sectorized" communication where the antenna pattern, particularly at the receiver, is not changing over time such that configurations must be "scheduled". One good example of where such a co-ordination (or scheduling) has to occur ahead of communication is in the service access period of the IEEE 802.11ad system. In the case of a client station receiving a frame, the transmitter is always the serving AP, and hence TA is known. In the case of the AP receiving a frame, it is always the client station that the AP scheduled to use the wireless medium at the time of the frame being received.

Hence, in the case of a beamforming system, the operation of determining the transmitter to find the RA to use in an ACK frame is potentially simplified at the AP, or in general the node that is controlling or coordinating access to the wireless medium. In the case of a dedicated beam vector or ID per client station served, then during beamforming training, the AP or coordinator will know that beamX is associated with a node with addrY. The AP or coordinator remembers the mapping of address of a node to the beam by which it is served, so it can instruct the PHY layer to send/receive frame to/from addrY by using BeamX. This table is referred to here as the beam mapping table.

This beam mapping table can then be used to form the ACK. Knowing that the data frame was received on beamE with SA=addr3 and DA=addr5, for example, the AP looks up the node address associated with beamE in the beam mapping table to find the RA address for the ACK frame. The AP also looks up in the forwarding table the beam associated with addr5 to know how to forward the data frame. The net result is that frames can be forwarded and ACKed using simple forwarding and beam mapping tables, and without requiring manipulation of the frame header. Essentially the wireless system starts to look very much like a wired layer-2 system, but still supports critical features of a wireless system such as hop-by-hop ACKs (or any other form of feedback).

If there exists the case where multiple nodes may be associated with any one beam setting, for example if relatively "coarse" beams are being used such that the same set of antenna weights (or vector or configuration) is associated with two or more nodes, then it will not be possible to uniquely determine the RA to use for the ACK from the beamID on which the data frame was received, at the AP or coordinator.

To circumvent this, an alternative approach is for the AP or coordinator to retain its schedule used to assign resources to the client nodes or in general for a node to retain the schedule of when other nodes may communicate with it, and do a time based lookup to determine which node was allocated to use the wireless medium at the time the frame was received. In this case, instead of using the beam mapping table to determine RA from beamID, it uses the scheduling information table to determine RA based on time of receipt.

If there exists the case where multiple nodes may be associated with the same time or same beam, but the ordered pair (time, beamID) is unique, then a combined lookup into both tables can be executed to determine the RA to use. This can be further extended in the case division of users is also performed in the frequency domain, such as an FDMA based system using multiple frequencies and/or channels, with a look up of (frequency, time, beam) of the received data frame returning a unique RA to use.

The additional advantage of zero header manipulation is that the frame check sequence (or header check sequence in some other protocols) does not need to be recomputed, assuming the frame is not altered. Therefore as soon as the SA and DA have been read from the frame header, the frame can be requeued for transmission on the new "beam ID" without having to do any processing, and only minimal forwarding table lookup is required to resolve beam ID from the DA (and to check an entry is in place for the SA). Benefit of this include:

Very low latency forwarding at the lower layer of the MAC (read DA and SA only; no manipulation required);

Very low computational complexity to determine how to forward a frame; and,

Reduced memory size requirements for the forwarding table.

A final further optimization can be to completely omit the RA and TA address fields to reduce the header size by defining a new frame type that only contains DA and SA, making the wireless layer-2 packet header more like the header in a typical wired layer-2 network, but still supporting key wireless features required to support link robustness such as ACK and feedback.

Figure 11:
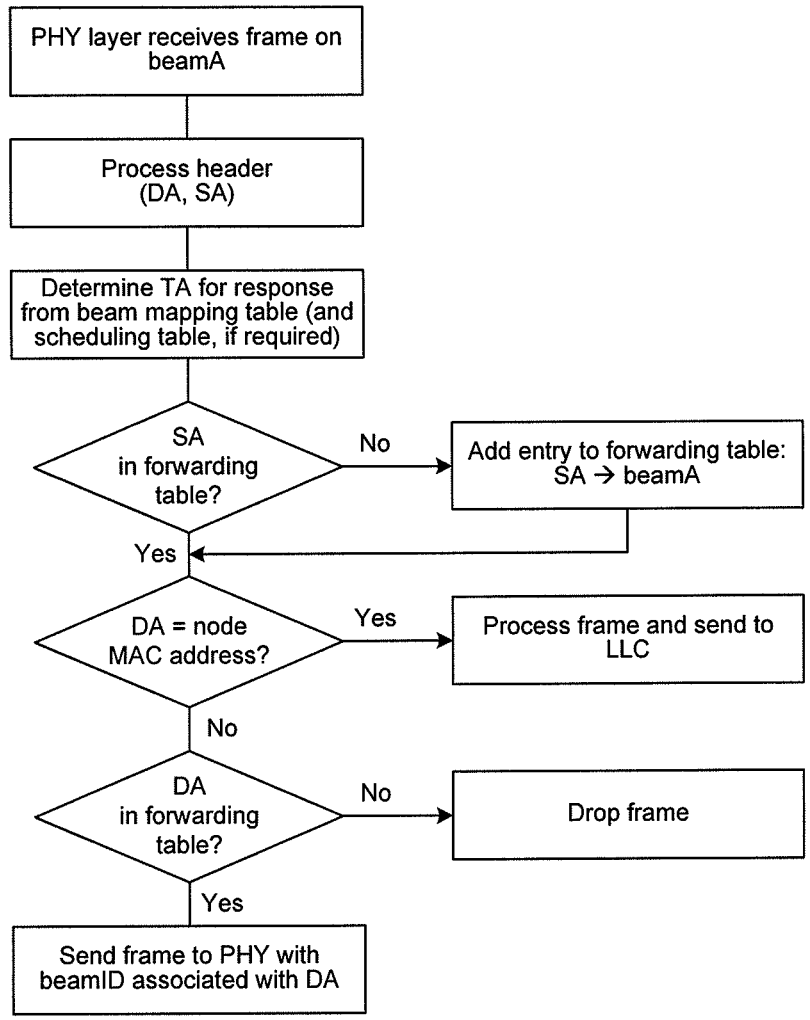
FIG. 11 is a flow chart illustrating a further optimized forwarding function procedure, with zero header manipulation, at each node in the beamforming multi-hop point-to-multipoint or multi-hop mesh layer-2 wireless network.

In general the above procedure requires the following behavior, as summarized in FIG. 11, at each node:

1. The PHY layer of a node receives a frame on beamA, and informs the MAC of frame reception;
2. The node then generates any ACK or response frame for transmission on beamA, resolving the RA to use by looking up the address of the node associated with communications on beamA, from the beam mapping table. In the case of a system where beamID is not a unique mapping to a MAC address of a node, then it also uses information from the scheduling table (which it has either constructed itself if it is an AP or a coordinator, or has learnt from the node controlling or coordinating access to the wireless medium) to resolve for the RA to use;
3. Next it inspects the SA to see if it has a beamID entry in its forwarding table, if not then it knows that SA can be reached through beamA, and adds this to the table;
4. The MAC inspects the DA field of the header to see if it is the intended destination, if not it knows it needs to forward the frame;
5. If it needs to forward, then it looks up the beamID to use when forwarding based on the DA (if this is unknown then it defaults to sending the frame in the direction of the superordinate node, if this feature is allowed, otherwise it will not forward the frame);
6. The frame is ready for forwarding without the need to manipulate the header; and,
7. Finally the node sends the frame to the PHY layer for transmission on the beamID found from the forwarding table.

Note that while step 5) may increase the computational complexity associated with generating the ACK frame, the key point is that the latency required to have the frame ready for forwarding is minimized. In general this is the important timing path in forwarding a frame in an end-to-end system, so trading a small increase in potential latency and/or computational complexity in generating the ACK for reduction in the latency/complexity to forward the data frame enables the overall system level performance to benefit as the data-plane round-trip time will be minimized.

Complementary Security Framework

In wireless systems, typically the communication between two wireless nodes is protected by a combination of authentication to allow the node to be "associated with and connected to" to the AP to gain access to the network, and also for the frames exchanged over the communication channel to be protected by encryption.

If encryption is performed on a hop-by-hop basis in a multi-hop point-to-multipoint of multi-hop mesh system, then even if the payload and header are unchanged at an RS, the frame payload still has to be decrypted and re-encrypted using new keys associated with the next "link", adding unnecessary latency. Therefore another approach is to use a centralized end-to-end security framework for encrypting frames transiting through multiple nodes to reach the destination. There are two options that are envisaged to be part of the system:

1. higher-layer end-to-end security: for example IPSec, such that no layer-2 encryption is needed as the payload is encrypted before sending down to the lower-layers for transmission; or
2. end-to-end layer-2 encryption: any two nodes in the system that exchange data frames perform an end-to-end security handshake (referred to as centralized encryption), yet localized (link-by-link) protection of other messages can be maintained (e.g. control and management frames between the AP and client).

In the case of 1), no modification is required to a layer-2 wireless system as encryption may not be used and hence frames can be forwarded without manipulation. In the case of 2), then individual "end nodes" (where frames pass through the MAC_SAP to/from higher layers) may negotiate to perform end-to-end encryption, just like the nodes may if performing layer-3 security.

In general, aspects of the invention include a multi-hop wireless communication system that inherently utilizes beamforming to enable communication between nodes and exploits the analogy between "beams" in such a layer-2 wireless network and "ports" in a layer-2 wired network to enable efficient, in both time and computational complexity, procedures for managing the process of relaying or forwarding frames between nodes in a multi-hop point-to-multipoint or multi-hop mesh network.

Further, aspects of the invention include a wireless communication system that utilizes beamforming where a beamID is used to ensure a frame is transmitted towards a particular node (or set of nodes) instead of using the full MAC (or other) address of the node targeted to receive the frame. Such a system enables reduced or zero manipulation of frame headers to reduce frame processing requirements and/or latency associated with frame forwarding.

Also, aspects of the invention include a wireless communication system that utilizes beamforming and the beamID alone or in combination with other scheduling related information (time and/or frequency) to determine the transmitter of a particular frame in order to generate a response to that transmitter (such as an ACK or feedback information).

Other, aspects of the invention include a procedure for enabling a wireless communications node in a multi-hop point-to-multipoint or multi-hop mesh network that uses beamforming to facilitate communication between nodes to efficiently forward frames at the wireless MAC layer between nodes, and to efficiently build and store forwarding table information. The procedure enables both the frame latency induced by the forwarding function, and the processing and memory requirements associated with the forwarding function to be minimized in such a system. Such a procedure is operable to learn the mapping of beamID to address by monitoring special types of frame transmissions (such as ARP request and response, or other messages that generate a request/response over multiple hops in the network) and to record the learnings into a tables for use at a later time.

Such a procedure may also utilizes the learned information referred to above to resolve a next beamID to use when forwarding a frame destined for another node based on the end destination address. The procedure may further utilize the learned information referred to above, possibly in conjunction with scheduling information that is either derived at the node or communicated to it, to determine the receiver address to use in a response frame.

Among the implementations described herein is a wireless communications module for communicating with a wireless device, comprising: a packet processing function (PPF) configured to exchange communications between the wireless device and a network, wherein the PPF is configured to exchange frames between the module and the wireless device, and wherein the PPF is configured to communicatively couple with at least one other module at a first node; a wireless MAC layer component, coupled to the PPF, and configured to forward frames across beamformed wireless communication links to a second node; and a millimeter wave (30 GHz-300 GHz) physical layer and radio transceiver component coupled to the wireless MAC layer component, wherein the physical layer and radio transceiver component includes a multi-element antenna array configured to provide the beamformed wireless links to the second node. The PPF may be a layer-2 switch. The multi-element antenna array may be further configured to operate in a bandwidth of 1 GHz or more. The wireless module may be configured to operate in a first bandwidth under first conditions, and a second bandwidth under second conditions, wherein the second conditions are associated with a degradation of the beamformed wireless links between the first node and the second node, and wherein the second bandwidth is less than the first bandwidth. The wireless module may be integrated in either an embedded or pluggable form at the first node to provide wireless backhaul connectivity for a host node. The wireless MAC layer component may be configured to provide dynamic multi-hop point-to-multipoint and/or mesh network topologies over a communication link using dynamic beam forming with directional transmissions.

The physical layer and radio transceiver component may include a first radio frequency integrated circuit (RFIC) coupled to a first set of antenna elements, and a second RFIC coupled to a second set of antenna elements, wherein the first RFIC is configured to operate in a transmit mode and the second RFIC is configured to operate in a receive mode to provide the beamformed wireless links to the second node, and wherein the second RFIC is configured to filter a signal transmitted by the first set of antenna elements from a signal received by the second set of antenna elements after the received signal has been digitized without the transmitted signal first being filtered from the received signal in an analog domain. The first and second RFICs and the first and second antenna elements may be configured to provide the beamformed wireless links to the second node for a self-organizing network that includes the wireless communication module. In some implementations the physical layer and radio transceiver component includes: an analog phased array beam-forming based RFIC, and a multi-gigabit per second (Gbps) capable baseband processing element; and the wireless MAC layer component may comprise a multi-Gbps beam-aware point-to-multi-point MAC processing engine.

The physical layer and radio transceiver component may include at least two RFICs and a baseband engine, wherein the at least two RFICs are configured to all operate in a transmit mode or a receive mode on a same channel at a same time, and wherein the physical layer and radio transceiver component is configured to combine signals associated with each of the at least two RFICs either prior to or in the baseband engine. The physical layer and radio transceiver component may include at least two RFICs and a baseband engine, wherein the at least two RFICs are configured to: increase a gain of a signal of the beamformed wireless links to the second node by operating at least two of the RFICs in a transmit mode or a receive mode on a same channel at a same time, and provide for a beamformed wireless link to a third node by operating at least one of the at least two RFICs in transmit mode for transmitting a signal to the second node and at least one of the at least two RFICs in receive mode for receiving a signal from the third node.

A quantity of antenna elements in the first set of antenna elements may be greater than a quantity of transmit and/or receive chains so as to enable greater array gain. The physical layer and radio transceiver component may include a first RFIC coupled to a first set of antenna elements, and a second RFIC coupled to a second set of antenna elements, wherein the physical layer and radio transceiver component includes a baseband processing engine, wherein channels used for transmit and/or receive on the first RFIC and the second RFIC are defined in computer-executable instructions stored in a memory of the baseband processing engine, and wherein a duplexing mode, including frequency division full-duplex (FDD) or time division full-duplex (TDD), is defined in computer-executable instructions stored in the memory of the baseband processing engine. The physical layer and radio transceiver component may include a RFIC coupled to a set of antenna elements, wherein the physical layer and radio transceiver component includes a baseband processing engine configured to perform software defined duplexing. The physical layer and radio transceiver component may be configured to perform software defined duplexing for operation in the following modes: a full duplex relay mode with full duplex links; a full duplex relay with half duplex links; a half duplex relay with full duplex links; and a half duplex relay with half duplex links.

Also among the implementations described herein is a network node for communicating with a wireless device, comprising: a housing; at least two wireless communications modules within the housing, wherein each wireless communications module includes: a PPF configured to communicate with the wireless device, wherein the PPF is configured to exchange frames between the module and the wireless device, and wherein the PPF is configured to couple with at least one other module at the node; a wireless MAC layer component, coupled to the PPF, and configured to forward frames across beamformed wireless communication links to another node; and a millimeter wave (30 GHz-300 GHz) physical layer and radio transceiver component coupled to the wireless MAC layer component, wherein the physical layer and radio transceiver component includes a multi-element antenna array configured to provide the beamformed wireless links to the other node. The node may communicate with at least two other nodes, wherein each node provides a communication path between two end-points, wherein the nodes autonomously create the communication path and relay frames via one or more intermediate nodes without the need for external assistance, and wherein the nodes are able to dynamically update communication paths to adapt to changes in network topology. The at least two wireless communications modules are configured to provide, in combination, functionality required at a hub, a relay station, an access point, or an end-point station.

Also among the implementations described herein is an apparatus for communicating with a wireless device, comprising: packet processing function means for exchanging packets or frames between the wireless device and a network; MAC layer means, coupled to the packet processing function means, for forwarding frames across beamformed wireless communication links to a node; and a millimeter wave (30 GHz-300 GHz) physical layer and radio transceiver means, coupled to the MAC layer means for providing the beamformed wireless links to the node. A packet processing function (PPF) may be configured to exchange communications between the wireless device and a network, wherein the PPF is configured to exchange frames between the module and the wireless device, and wherein the PPF is configured to communicatively couple with at least one other module at a first node; a wireless MAC layer component, coupled to the PPF, and configured to forward frames across beamformed wireless communication links to a second node, and a millimeter wave (30 GHz-300 GHz) physical layer and radio transceiver component coupled to the wireless MAC layer component, wherein the physical layer and radio transceiver component includes a multi-element antenna array configured to provide the beamformed wireless links to the second node, wherein the physical layer and radio transceiver component includes an RFIC that interfaces directly with the MAC layer, wherein the physical layer and radio transceiver component includes a baseband processing engine; wherein the wireless MAC layer is configured to drive the baseband processing engine and the RFIC concurrently based at least in part on a beam configuration specified by the MAC layer.

Also among the implementations described herein is a method of controlling beamforming of an RFIC, the method performed by a processor executing instructions stored in a memory, the method comprising: maintaining a mapping that associates antenna weight vector (AWV) identifiers (IDs) or antenna element map (AEM) IDs with nodes, maintaining a mapping that associates AWV IDs with a phase shift and amplitude gain or AEM IDs with a vector or array element configuration parameter; receiving an indication to create a beamformed wireless link with a node; identifying an AWV ID or an AEM ID associated with the node based on the mapping; identifying vector or array element configuration parameters associated with the AEM ID or a phase shift and amplitude gain associated with the AWV ID; and configuring an antenna beam for the beamformed wireless link with the node by: applying the vector or array element configuration parameters to an antenna element array transmitting a signal; and/or driving the antenna element array to generate the signal modified by the phase shift and/or amplitude gain associated with the AWV ID. The method may further comprise optimizing the vector or array element configuration parameter during a beam training, refinement, and/or tracking phase. The vector or array element configuration parameters may include parameters for each polarization of the antenna element array, wherein the method further comprises: applying the parameters for each polarization to the antenna element array; driving the antenna element array to employ multiple-inputmultiple-output techniques to transmit the signal and receive a different signal simultaneously over multiple polarizations.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A system for enabling communication between nodes, the system comprising:
   a first wireless communication module configured to utilize beamforming to communicate with other wireless communication modules; and
   a second wireless communication module configured to utilize beamforming to communicate with the first wireless communication module;
   wherein the first wireless communication module is further configured to:
   receive a frame to be transmitted;
   determine that a destination address for the frame is not equal to a receiving address for the frame;
   look up a next hop receiving address for the frame in a table associated with forwarding frames;
   modify a header of the frame to include the next hop receiving address in a receiving address field and an identifier associated with the first wireless communication module in a transmitter address field;
   identify a beam vector associated with the next hop receiving address; and
   transmit the frame according to the beam vector associated with the next hop receiving address.

2. The system of claim 1, wherein the first and second wireless communication modules are nodes in a multi-hop point-to-multipoint mesh network.

3. The system of claim 1, wherein the first and second wireless communication modules are nodes in a multi-hop mesh network.

4. A system for enabling communication between nodes, the system comprising:
   a first wireless communication module configured to utilize beamforming to communicate with other wireless communication modules; and
   a second wireless communication module configured to utilize beamforming to communicate with the first wireless communication module;
   wherein the first wireless communication module is further configured to:
   receive, at a physical layer, a frame to be transmitted;
   determine that a destination address for the frame is not equal to a receiving address for the frame;
   identify a beam identifier associated with the destination address;
   modify a header of the frame by replacing a transmitter address with a MAC address associated with the first wireless communication module;
   re-compute a header check sequence; and
   transmit the frame with modified header via a communication link established based on the beam identifier.

5. The system of claim 4, the second wireless communication module does not manipulates a header of the frame.

6. The system of claim 4, further comprising a third wireless communication module, wherein the third wireless communication module is configured to transmit the frame to the second wireless communication module,
 wherein the third wireless communication module is configured to encrypt a payload of the frame prior to transmitting the frame to the second wireless communication module, and
 wherein the first wireless communication module is configured to decrypt the payload of the frame.

7. The system of claim 4, wherein the second wireless communication module and the first wireless communication module are configured to perform an end-to-end security handshake.

8. A system for enabling communication between nodes, the system comprising:
 a first wireless communication module configured to
 utilize beamforming to communicate with other wireless communication modules; and
 a second wireless communication module configured to
 utilize beamforming to communicate with the first wireless communication module;
 wherein the first wireless communication module is further configured to:
  receive, at a physical layer via a beamformed wireless link associated with a receiving beam identifier, a frame to be transmitted;
  identify a receiving address associated with a node associated with the receiving beam identifier;
  transmit an acknowledgment of the frame to the receiving address;
  identify a destination address associated with the frame;
  determine that the destination address for the frame does not correspond to the first wireless communication module;
  identify a beam identifier associated with the destination address, wherein the beam identifier identifies a particular beam;
  transmit the frame via a communication link established based on the beam identifier associated with the destination address;
  determine whether a source address associated with the frame is associated with a beam identifier in a forwarding table; and
  when the source address is not associated with a beam identifier in the forwarding table, add the receiving beam identifier to the forwarding table in association with the source address.

9. A method for forwarding a frame from a first wireless communication module to a second wireless communication module, wherein the first and the second wireless communication modules utilize beamforming, the method performed by the first wireless communication module, the method comprising:
 receiving a frame to be transmitted;
 determining that a destination address for the frame is not equal to a receiving address for the frame;
 looking up a next hop receiving address for the frame in a table associated with forwarding frames;
 modifying a header of the frame to include the next hop receiving address in a receiving address field and an identifier associated with the first wireless communication module in a transmitter address field;
 identifying a beam vector associated with the next hop receiving address; and
 transmitting the frame according to the beam vector associated with the next hop receiving address.

10. The method of claim 9,
 wherein the destination address is equal to a multi-cast or broadcast address,
 wherein identifying a beam vector associated with the next hop receiving address comprises identifying multiple beam vectors, and
 wherein transmitting the frame according to the beam vector includes transmitting the frame multiple times according to the multiple beam vectors.

11. The method of claim 9, further comprising:
 receiving a second frame to be transmitted, and
 determining to transmit the second frame via a physical layer.

12. The method of claim 9, wherein the frame is received via a beamformed wireless link associated with a receiving beam identifier, wherein the method further comprises:
 determining whether a source address associated with the frame is associated with a beam identifier in a forwarding table; and
 when the source address is not associated with a beam identifier in the forwarding table, adding the receiving beam identifier to the forwarding table in association with the source address.

13. A method for forwarding a frame from a first wireless communication module to a second wireless communication module, wherein the first and the second wireless communication modules utilize beamforming, the method performed by the first wireless communication module, the method comprising:
 receiving, at a physical layer, a frame to be transmitted;
 determining that a destination address for the frame is not equal to a receiving address for the frame;
 identifying a beam identifier associated with the destination address;
 modifying a header of the frame by replacing a transmitter address with a MAC address associated with the first wireless communication module;
 re-computing a header check sequence; and
 transmitting the frame with modified header via a communication link established based on the beam identifier.

14. The method of claim 13, wherein the frame is received via a beamformed wireless link associated with a receiving beam identifier, wherein the method further comprises:
 determining whether a source address associated with the frame is associated with a beam identifier in a forwarding table; and
 when the source address is not associated with a beam identifier in the forwarding table, adding the beam identifier to the forwarding table in association with the source address.

15. The method of claim 13, further comprising:
 identifying a transmitter address associated with the received frame; and
 transmitting an acknowledgement to the transmitter address.

16. A method for forwarding a frame from a first wireless communication module to a second wireless communication module, wherein the first and the second wireless communication modules utilize beamforming, the method performed by the first wireless communication module, the method comprising:
 receiving, at a physical layer via a beamformed wireless link associated with a receiving beam identifier, a frame to be transmitted;

identifying a receiving address associated with a node associated with the receiving beam identifier;

transmitting an acknowledgment of the frame to the receiving address;

identifying a destination address associated with the frame;

determining that the destination address for the frame does not correspond to the first wireless communication module;

identifying a beam identifier associated with the destination address, wherein the beam identifier identifies a particular beam;

transmitting the frame via a communication link established based on the beam identifier associated with the destination address; and wherein identifying the receiving address comprises identifying the receiving address in a scheduling table based at least in part on a time that the frame was received.

17. A method for forwarding a frame from a first wireless communication module to a second wireless communication module, wherein the first and the second wireless communication modules utilize beamforming, the method performed by a first wireless communication module, the method comprising:

receiving, at a physical layer via a beamformed wireless link associated with a receiving beam identifier, a frame to be transmitted;

identifying a receiving address associated with a node associated with the receiving beam identifier;

transmitting an acknowledgment of the frame to the receiving address;

identifying a destination address associated with the frame;

determining that the destination address for the frame does not correspond to the first wireless communication module;

identifying a beam identifier associated with the destination address, wherein the beam identifier identifies a particular beam;

transmitting the frame via a communication link established based on the beam identifier associated with the destination address;

determining whether a source address associated with the frame is associated with a beam identifier in a forwarding table; and when the source address is not associated with a beam identifier in the forwarding table, adding the receiving beam identifier to the forwarding table in association with the source address.

* * * * *